(12) United States Patent
Xu et al.

(10) Patent No.: US 11,456,930 B2
(45) Date of Patent: Sep. 27, 2022

(54) NETWORK RESOURCE MANAGEMENT METHOD, APPARATUS, AND SYSTEM

(71) Applicant: HUAWEI TECHNOLOGIES CO., LTD., Guangdong (CN)

(72) Inventors: Ruiyue Xu, Shanghai (CN); Lan Zou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/239,914

(22) Filed: Jan. 4, 2019

(65) Prior Publication Data

US 2019/0140921 A1    May 9, 2019

Related U.S. Application Data

(63) Continuation of application No. PCT/CN2016/089235, filed on Jul. 7, 2016.

(51) Int. Cl.
*G06F 15/16*  (2006.01)
*H04L 41/5019*  (2022.01)
(Continued)

(52) U.S. Cl.
CPC ...... *H04L 41/5019* (2013.01); *G06F 9/45558* (2013.01); *H04L 41/5012* (2013.01);
(Continued)

(58) Field of Classification Search
USPC .......................................................... 709/227
See application file for complete search history.

(56) References Cited

U.S. PATENT DOCUMENTS

| | | | |
|---|---|---|---|
| 6,449,650 B1 * | 9/2002 | Westfall | H04L 47/2441 709/227 |
| 7,551,622 B2 * | 6/2009 | Bozak | H04L 67/1002 370/468 |

(Continued)

FOREIGN PATENT DOCUMENTS

| | | |
|---|---|---|
| CN | 101083517 A | 12/2007 |
| CN | 101296512 A | 10/2008 |

(Continued)

OTHER PUBLICATIONS

International Search Report dated Jan. 4, 2017 in corresponding International Patent Application No. PCT/CN2016/089235 (7 pages).

(Continued)

*Primary Examiner* — Anthony Mejia
(74) *Attorney, Agent, or Firm* — Womble Bond Dickinson (US) LLP

(57) ABSTRACT

Embodiments of the present invention provide a network resource management method, an apparatus, and a system. The method includes: receiving, by a first management unit, a service request message, where the service request message is used to manage a target service, and the service request message carries target-service requirement information; determining, based on the service request message, a network resource that meets the target-service requirement information; or determining based on the service request message, network resource requirement information corresponding to the target-service requirement information, and sending, by the first management unit, a resource request message to a second management unit, where the resource request message is used to request the network resource, and the resource request message carries the network resource requirement information. According to the solutions in the embodiments of the present invention, the corresponding (Continued)

network resource can be obtained based on the target-service requirement information.

16 Claims, 19 Drawing Sheets

(51) Int. Cl.
| | |
|---|---|
| *H04W 28/00* | (2009.01) |
| *H04W 28/26* | (2009.01) |
| *G06F 9/455* | (2018.01) |
| *H04L 41/5009* | (2022.01) |
| *H04L 41/5041* | (2022.01) |

(52) U.S. Cl.
CPC ......... *H04L 41/5041* (2013.01); *H04W 28/00* (2013.01); *H04W 28/26* (2013.01); *G06F 2009/45595* (2013.01)

(56) References Cited

U.S. PATENT DOCUMENTS

| | | | | |
|---|---|---|---|---|
| 8,051,170 | B2* | 11/2011 | Turner | G06F 9/5072 709/227 |
| 8,266,297 | B2* | 9/2012 | Li | H04L 65/1063 709/227 |
| 8,325,658 | B2* | 12/2012 | Rosen | H04W 72/087 370/468 |
| 8,825,797 | B2* | 9/2014 | Wang | H04W 8/20 709/217 |
| 9,560,162 | B2* | 1/2017 | Foti | H04W 4/70 |
| 9,569,476 | B2* | 2/2017 | Dejana | G06F 3/0665 |
| 9,672,502 | B2* | 6/2017 | Chaudhary | H04L 41/5041 |
| 10,445,128 | B2* | 10/2019 | Yamato | G06F 11/3051 |
| 10,824,454 | B2* | 11/2020 | Shaw | H04W 12/084 |
| 2003/0135646 | A1* | 7/2003 | Inoue | H04L 67/1012 709/241 |
| 2006/0271679 | A1 | 11/2006 | Mousseau et al. | |
| 2008/0259794 | A1 | 10/2008 | Zou et al. | |
| 2009/0052390 | A1 | 2/2009 | Gu et al. | |
| 2011/0035487 | A1 | 2/2011 | Ouyang et al. | |
| 2011/0113141 | A1* | 5/2011 | Veenstra | H04L 65/1006 709/226 |
| 2012/0066487 | A1* | 3/2012 | Brown | G06F 9/5083 709/224 |
| 2012/0130936 | A1* | 5/2012 | Brown | G06Q 10/0633 706/52 |
| 2013/0339529 | A1 | 12/2013 | Rizzo et al. | |
| 2014/0052838 | A1* | 2/2014 | Giacomoni | H04L 41/0893 709/223 |
| 2014/0289413 | A1* | 9/2014 | Chan | H04L 47/78 709/226 |
| 2015/0120892 | A1* | 4/2015 | Mordani | H04L 41/5054 709/222 |
| 2015/0331715 | A1* | 11/2015 | Sathyanarayana | H04L 67/10 718/1 |
| 2016/0127465 | A1* | 5/2016 | Barstow | G06F 16/273 707/620 |
| 2016/0269493 | A1* | 9/2016 | Nasielski | H04L 67/16 |
| 2016/0315802 | A1 | 10/2016 | Wei et al. | |
| 2017/0063598 | A1* | 3/2017 | Zhu | H04L 41/5041 |
| 2017/0222889 | A1 | 8/2017 | Zong et al. | |
| 2018/0095778 | A1* | 4/2018 | Aydelott | H04L 43/04 |
| 2018/0181424 | A1* | 6/2018 | Gokurakuji | H04L 67/16 |
| 2018/0241843 | A1* | 8/2018 | Bardhan | H04L 41/5003 |
| 2018/0242188 | A1* | 8/2018 | Pang | H04W 72/10 |
| 2018/0329735 | A1* | 11/2018 | Liu | G06F 9/5077 |
| 2019/0034460 | A1 | 1/2019 | Eberlein | G06F 16/285 |
| 2019/0109756 | A1* | 4/2019 | Abu Lebdeh | G06F 9/45558 |
| 2020/0228990 | A1* | 7/2020 | Xu | H04L 67/141 |

FOREIGN PATENT DOCUMENTS

| | | |
|---|---|---|
| CN | 101378327 A | 3/2009 |
| CN | 105282195 A | 1/2016 |
| CN | 105471611 A | 4/2016 |
| CN | 105681225 A | 6/2016 |
| CN | 105682069 A | 6/2016 |
| EP | 1860825 A1 | 11/2007 |
| EP | 2993829 A1 | 3/2016 |
| WO | 2015100611 A1 | 7/2015 |

OTHER PUBLICATIONS

Written Opinion of the International Searching Authority dated Jan. 4, 2017 in corresponding International Patent Application No. PCT/CN2016/089235 (4 pages).

International Search Report dated Apr. 1, 2017 in corresponding International Application No. PCT/CN2016/089235.

Extended European Search Report dated Apr. 26, 2019 in corresponding European Patent Application No. 16907886.2 (9 pages).

* cited by examiner

NETWORK RESOURCE MANAGEMENT METHOD, APPARATUS, AND SYSTEM

CROSS-REFERENCE TO RELATED APPLICATIONS

This application is a continuation of International Application No. PCT/CN2016/089235, filed on Jul. 7, 2016, the disclosure of which is hereby incorporated by reference in its entirety.

TECHNICAL FIELD

Embodiments of the present invention relate to the communications field, and in particular, to a network resource management method, an apparatus, and a system.

BACKGROUND

Currently, communications services are thriving, and communications network virtualization further accelerates development of communications services. The thriving communications services are different from conventional communications services, and operators have to confront with a dynamically changing market and new differentiated requirements. How to use an existing communications network to quickly respond to business-to-business (B2B), business-to-customer (B2C), and other service requirements and launch and provision a new service in time puts a huge competitive pressure on operators.

In this background, a network functions virtualization (NFV) technology is put forward. The NFV technology is a technology in which a network function is run on a general-purpose physical device. For example, the NFV technology enables a virtual machine to be deployed on a physical device. FIG. 1 shows an NFV-based network architecture. The NFV-based network architecture uses a network functions virtualization orchestrator (NFVO,) unit. The NFVO is mainly responsible for network service lifecycle management and resource (for example, a computing resource, a memory resource, and a storage resource) orchestration, and also responsible for managing and orchestrating a resource on a network functions virtualization infrastructure (NFVI), and the like. However, the resource orchestration implemented by the NFVO is unrelated to any communications service. In the existing solution, a corresponding network resource cannot be obtained based on a communications service.

SUMMARY

Embodiments of the present invention provide a network resource management method, an apparatus, and a system, to resolve a prior-art problem of failure to obtain a network resource corresponding to a communications service.

According to an aspect, an embodiment of the present invention provides a network resource management method, where the method includes: receiving, by a first management unit, a service request message, where the service request message is used to manage a target service, and the service request message carries target-service requirement information; determining, by the first management unit based on the service request message, a network resource that meets the target-service requirement information, where for example, the first management unit may select, from an existing network resource, a network resource that meets the target-service requirement information; or determining, by the first management unit based on the service request message, network resource requirement information corresponding to the target-service requirement information, where for example, the network resource requirement information that is determined by the first management unit based on the service request message may be requirement information used to request a network slice, requirement information used to request a requirement for a key performance indicator, capacity requirement information, and the like; and sending, by the first management unit to a second management unit, a resource request message that is used to request the network resource, where the resource request message carries the network resource requirement information, so as to obtain the network resource that meets the network resource requirement information, and manage the target service.

In the solution in this embodiment of the present invention, after receiving the service request message, the first management unit can determine, based on the service request message, the network resource that meets the target-service requirement information, or determine, based on the service request message, the network resource requirement information corresponding to the target-service requirement information, and send the resource request message to the second management unit to request the network resource. In this way, according to the solution in this embodiment of the present invention, the corresponding network resource can be obtained based on the target-service requirement information. Therefore, automatic orchestration from the target service to the network resource is implemented, and dynamically adjusting a network resource becomes less complex.

The first management unit may be an SO or a service and network orchestrator unit, and the second management unit may be an NO, a network manager unit, or an element manager unit. For example, the first management unit is an SO, and the second management unit is an NO; or for another example, the first management unit is an SO, and the second management unit is an element manager unit, an NFVO unit, or an RO unit; or for another example, the first management unit is a service and network orchestrator unit, and the second management unit is an element manager unit.

The target service may be sent by a customer, an OSS, or a BSS to the first management unit by using the service request message. The target service may be a group of specified Service Level Agreement (SLA) communications services that are available for a user, for example, a mobile broadband (MBB) service, a voice service, and an Internet of Things (TOT) service (for example, intelligent parking and intelligent metering). The first management unit may manage the target service. For example, the first management unit may manage a lifecycle of the target service. For example, the management performed by the first management unit on the target service may include one or any combination of the following cases: instantiation, creation, scale-out, scale-in, or update.

In a possible design, the method further includes: determining, by the first management unit, whether there is a network resource that meets the target-service requirement information. For example, the first management unit may determine, based on the target-service requirement information, whether an existing network resource of the first management unit meets the requirement, or the first management unit determines whether an existing network resource can implement the target-service requirement information. In this way, when the first management unit has an existing network resource that can implement the target-service requirement information, the first management unit can manage the target service by directly using the existing network resource that meets the requirement, for example, instantiating the target service based on the existing network resource that meets the requirement. In this way, managing the target service becomes more convenient, thereby reducing costs of managing the target service by the first management unit. In addition, when the first management unit determines that there is no network resource that meets the target-service requirement information, the first management unit may determine network resource requirement information corresponding to the target-service requirement information, and send the resource request message to the second management unit to request the network resource, thereby implement management of the target service.

In a possible design, the determining, by the first management unit based on the service request message, network resource requirement information corresponding to the target-service requirement information may include: obtaining, by the first management unit, a target service template or a network resource template based on the service request message, where the target service template or the network resource template corresponds to the target-service requirement information and includes the network resource requirement information or includes indication information that is used to obtain the network resource requirement information. After obtaining the target-service requirement information, the first management unit first determines whether there is an available target service instance that meets the target-service requirement information. When determining that there is no available target service instance that meets the target-service requirement information, the first management unit obtains the target service template or the network resource template based on the target-service requirement information, where the target service template or the network resource template meets the target-service requirement information. For example, when the service request message carries a target template identifier, the first management unit may select, from an existing target service template, a target service template or a network resource template by using the target template identifier, where the target service template or the network resource template matches the target template identifier. For another example, when the service request message carries the target-service requirement information, the first management unit may obtain the target service template corresponding to the target-service requirement information. In addition, the method includes: determining, by the first management unit, the network resource requirement information based on the target service template or the network resource template. For example, the target service template or the network resource template stores the network resource requirement information, and the first management unit may obtain the network resource requirement information by parsing the target service template or the network resource template.

In a possible design, the determining, by the first management unit based on the service request message, network resource requirement information corresponding to the target-service requirement information includes: determining, by the first management unit, sub-service requirement information of the target service based on the service request message; and determining, by the first management unit, the network resource requirement information based on the sub-service requirement information.

In a possible design, the method may further include: determining, by the first management unit, whether the target service includes a sub-service. For example, the first management unit may determine, by parsing the service request message, whether the target service includes a sub-service. When the target service includes at least one sub-service, the sub-service requirement information may be directly carried in the service request message, or may be carried in the target service template. The method may further include: determining, by the first management unit, the network resource requirement information based on the sub-service requirement information. For example, when the target service includes at least one sub-service, the first management unit determines, based on requirement information of each sub-service, a network resource required for each sub-service, and determines the network resource requirement information based on the network resource required for each sub-service. For example, when the target service includes a sub-service, the first management unit first determines whether there is an available sub-service instance that meets requirement information of each sub-service. When determining that there is no available sub-service instance that meets requirement information of a specific sub-service, the first management unit obtains a corresponding sub-service template or network resource template based on the requirement information of the sub-service. The sub-service template includes indication information or the network resource requirement information, and the indication information is used to obtain the network resource requirement information.

In a possible design, the network resource includes at least any one of a network slice, a network function, a network service, a transmission resource, or a network element. For example, when the target-service requirement information carried in the service request message is requesting a network service, after the first management unit converts the target-service requirement information into network resource requirement information, a network resource requested in the network resource requirement information should be the network service. For another example, when the target-service requirement information carried in the service request message is enabling the target service to possess a network function (for example, a backup function), after the first management unit converts the target-service requirement information into network resource requirement information, a network resource requested in the network resource requirement information should be a network function that enables the target service to possess the backup function.

In a possible design, the target-service requirement information includes at least one of a service descriptor identifier, a network resource descriptor identifier, service type information, access control information, SLA information (for example, a latency, coverage, and a traffic model), or a terminal usage type. For example, a customer, an OSS, or a BSS may send, to the first management unit, a request message for enabling the target service to meet required SLA information. The request message of the SLA information carries a request message of a preset latency, preset coverage, and a preset traffic model. For another example, a customer, an OSS, or a BSS may send, to the first management unit, a request message of a terminal usage type, and the request message of the terminal usage type carries a terminal identifier.

According to another aspect, an embodiment of the present invention provides another network resource management method, where the method includes: receiving, by a second management unit, a first resource request message from a first management unit, where the first resource request message is used to request a first network resource, and the first resource request message carries first network resource requirement information; and determining, by the second management unit based on the first resource request message, a second network resource that meets the first network resource requirement information; or determining, by the second management unit based on the first resource request message, second network resource requirement information corresponding to the first network resource requirement information, and sending, by the second management unit, a second resource request message to a third management unit, where the second resource request message is used to request the second network resource, and the second resource request message carries the second network resource requirement information.

According to the foregoing solution, the second management unit can determine, based on the first resource request message sent by the first management unit, the second network resource that meets the first network resource requirement information, or determine, based on the first resource request message sent by the first management unit, the second network resource requirement information corresponding to the first network resource requirement information and send the second resource request message to the third management unit to request a second network resource. In this way, according to the solution in this embodiment of the present invention, the corresponding second network resource can be obtained based on the first network resource requirement information. Therefore, automatic orchestration from the first network resource requirement information to the second network resource can be implemented, automatic orchestration from the target service to the network resource is complete, and dynamically adjusting a network resource becomes less complex.

In a possible design, the second management unit may determine whether there is a second network resource that meets the first network resource requirement information. For example, the second management unit may query an existing second network resource library, and determine whether the existing second network resource library includes a second network resource that can implement the first network resource requirement information. Alternatively, determining may be performed in other manners. When the existing second network resource library includes a second network resource that meets the first network resource requirement information, the second management unit may configure the second network resource based on the first network resource requirement information, to obtain the first network resource, and then send the first network resource to the first management unit. When the existing second network resource library does not include a second network resource that meets the first network resource requirement information, the second management unit may interact with the third management unit to obtain a corresponding second network resource.

In a possible design, the determining, by the second management unit based on the first resource request message, second network resource requirement information corresponding to the first network resource requirement information may include: obtaining, by the second management unit, a first network resource template or a second network resource template based on the first resource request message, where the first network resource template or the second network resource template corresponds to the first network resource requirement information, the first network resource template includes indication information or the second network resource requirement information, and the indication information is used to obtain the second network resource requirement information; and determining, by the second management unit, the second network resource requirement information based on the first network resource template or the second network resource template.

In a possible design, the first network resource may include a network slice, and the second network resource may include at least one of a network function, a transmission resource, a network service, or a network element.

According to still another aspect, an embodiment of the present invention provides an apparatus. The apparatus can implement functions performed by the first management unit in the foregoing method examples, and the functions may be implemented by hardware or by hardware executing corresponding software. The hardware or the software includes one or more modules that correspond to the foregoing functions.

In a possible design, the apparatus includes a processing module and a communications module. The processing module is configured to support the apparatus in performing the corresponding functions in the foregoing method. The communications module is configured to support communication between the first management unit and other network elements. The apparatus may further include a memory. The memory is configured to couple with the processing module and store a program instruction and data that are necessary for the first management unit.

According to still another aspect, an embodiment of the present invention provides another apparatus. The apparatus can implement functions performed by the second management unit in the foregoing method examples, and the functions may be implemented by hardware or by hardware executing corresponding software. The hardware or the software includes one or more modules that correspond to the foregoing functions.

In a possible design, the apparatus includes a processing module and a communications module. The processing module is configured to support the apparatus in performing the corresponding functions in the foregoing method. The communications module is configured to support communication between the apparatus and other network elements or management units. The apparatus may further include a memory. The memory is configured to couple with the processing module and store a program instruction and data that are necessary for the second management unit.

According to still another aspect, an embodiment of the present invention provides a communications system. The system includes the apparatus that can implement functions of the first management unit and the apparatus that can implement functions of the second management unit in the foregoing aspects According to yet another aspect, an embodiment of the present invention provides a computer storage medium that is configured to store a computer software instruction used by the foregoing first management unit and that includes a program that is designed to execute the foregoing aspects.

According to yet another aspect, an embodiment of the present invention provides a computer storage medium that is configured to store a computer software instruction used by the foregoing second management unit and that includes a program that is designed to execute the foregoing aspects.

In the solutions in the embodiments of the present invention compared with the prior art, after receiving the service request message, the first management unit can determine, based on the service request message, the network resource that meets the target-service requirement information, or determine, based on the service request message, the network resource requirement information corresponding to the target-service requirement information, and send the resource request message to the second management unit to request the network resource. In this way, according to the solutions in the embodiments of the present invention, the corresponding network resource can be obtained based on the target-service requirement information. Therefore, automatic orchestration from the target service to the network resource is implemented, and dynamically adjusting a network resource becomes less complex.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

Network architectures and service scenarios described in the embodiments of the present invention are intended to describe the technical solutions in the embodiments of the present invention more clearly, but do not constitute limitation on the technical solutions provided in the embodiments of the present invention. A person of ordinary skill in the art may know that as the network architecture evolves and a new service scenario emerges, the technical solutions provided in the embodiments of the present invention can also be applied to resolve a similar technical problem.

The technical solutions provided in the embodiments of the present invention may be applied to a network management system. The network management system may or may not include an NFV system. The solutions in the embodiments of the present invention are described by using an example of a network management system that includes an NFV system, namely, an NFV-based network management system.

Figure 1:
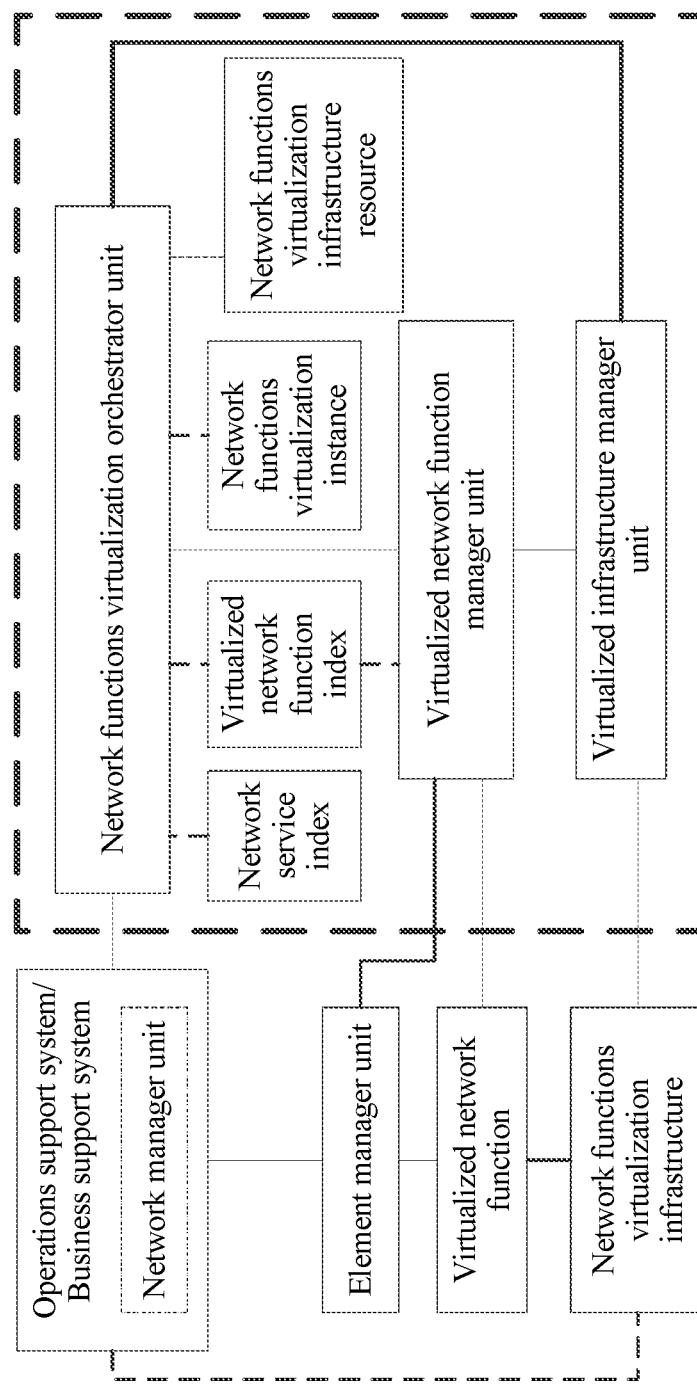
FIG. 1 is a schematic diagram of an NFV-based network architecture in the prior art.

FIG. 1 is a schematic diagram of a network architecture of an NFV-based network management system in the prior art. A service network and an operations support system are usually separated from each other in a conventional network architecture. Compared with the conventional network architecture, a network architecture in an NFV technology is de-structured vertically and horizontally. As shown in FIG. 1, a network architecture in an NFV environment includes three layers vertically:

Infrastructure layer: Network functions virtualization infrastructure (NFVI) may be understood as a resource pool from the perspective of cloud computing. Mapping the NFVI to a physical infrastructure is connecting a plurality of geographically separate data centers by using a high-speed communications network. The NFVI needs to convert a physical computing/storage/switching resource into a virtual computing/storage/switching resource pool through virtualization.

Virtual network layer: A virtual network layer corresponds to existing telecommunications service networks. Each physical network element is mapped as a virtualized network function (VNF) unit. A resource required by the VNF unit needs to be decomposed into a virtual computing/storage/switching resource and be carried by the NFVI. A signaling interface defined in a conventional network may be used as an interface between VNF units.

Service/network management layer: A service/network management layer includes an operations support system (OSS)/business support system (BSS) and an element manager (EM) unit, and needs to perform necessary modification and adjustment for virtualization. Optionally, the OSS/BSS may include a network manager (NM) unit. For ease of description, the network manager unit may be described as an NM unit or an NM below.

A network architecture in an NFV environment includes two domains horizontally: service network domain and resource management and orchestration (MANO) domain.

The service network domain corresponds to existing telecommunications service networks.

The MANO domain is added to a network in the NFV environment compared with the conventional network, and is responsible for managing and orchestrating overall NFVI resources, mapping and associating a service network and an NFVI resource, implementing an OSS service resource procedure, and the like. The MANO includes three units: a virtualized infrastructure manager (VIM) unit, a virtualized network function manager (VNFM) unit, and an NFVO unit. The three units respectively manage three layers: the NFVI, the VNF unit, and a network service (NS) provided by the service network. Optionally, the VNFM unit may be a virtual resource manager unit, or the VNFM unit may have a function of managing a virtual resource; the NFVO unit may be a virtual resource orchestrator unit, or the NFVO unit may have a function of orchestrating a virtual resource. Optionally, the MANO may further include a network service index, a virtualized network function index, a network functions virtualization instance, a network functions virtualization infrastructure resource, and the like.

Based on the network architecture shown in FIG. 1, two logical units are introduced to this solution in this embodiment of the present invention: a service orchestrator (SO) unit and a network orchestrator (NO) unit. For ease of description, the service orchestrator unit may be described as an SO unit or an SO, and the network orchestrator unit may be described as an NO unit or an NO below. In this embodiment of the present invention, the SO may be provided as a standalone functional entity, or the SO may be provided as a functional module of another functional entity, or a function of the SO may be integrated into another functional entity. Similarly, in this embodiment of the present invention, the NO may be provided as a standalone functional entity, or the NO may be provided as a functional module of another functional entity, or a function of the NO may be integrated into another functional entity. Further, the SO and the NO may be combined into one integrated entity. The integrated entity has a function of the SO and a function of the NO. For example, the integrated entity may be referred to as a service and network orchestrator unit. It may be understood that the integrated entity may have other names. This is not limited in this embodiment of the present invention. Similarly, in the case of the integrated entity, in this embodiment of the present invention, the integrated entity may be provided as a standalone functional entity, or the integrated entity may be provided as a functional module of another functional entity, or a function of the integrated entity may be integrated into another functional entity.

The function of the SO includes but is not limited to lifecycle management (for example, instantiation, creation, scale-out, scale-in, or update) of a service (service) based on a service request message sent by a BSS, service aggregation, service management (for example, fault, configuration, accounting, performance, and security (Fault, Configuration, Accounting, Performance, Security, FCAPS) management), and mapping between a service and a network slice. The service may be a group of specified Service Level Agreement (SLA) communications services that are available for a user, for example, a mobile broadband (MBB) service, a voice service, and an Internet of Things (JOT) service (for example, intelligent parking and intelligent metering).

The network slice may be a communications resource that ensures a carried business or service can meet an SLA requirement, or may be considered as a combination of a network function and a communications resource that are required for completing a service or some services.

The function of the NO includes but is not limited to: network slice management (for example, lifecycle management, FCAPS management, and network slice template management), network function management, mapping between a network slice and a network function, coordination between different types of network resources, coordination between network resources provided by different operators and different network providers, uniform orchestration of network devices provided by different providers to enable network resources provided by different network providers can meet a target service requirement (for example, an SLA requirement, a key performance indicator (KPI) requirement, and quality of service (QoS)), and external provision of an application programming interface (API) that is used to provide a network function for a third party to implement inter-operator deployment.

For example, lifecycle management performed by the NO on a network slice includes creating, deleting, updating the network slice or a network, and the like; and network slice template management performed by the NO includes creating, updating, deleting, activating, deactivating a network slice template or a network template, and the like.

FIG. 2a to FIG. 2e show several possible network architectures provided in embodiments of the present invention. Among the several possible network architectures, an architecture of a resource management and orchestration domain is the same as the architecture shown in FIG. 1. Refer to the description of FIG. 1. Details are not described again. The following describes disposition of an SO and an NO in the network architectures shown in FIG. 2a to FIG. 2e.

Figure 2A:
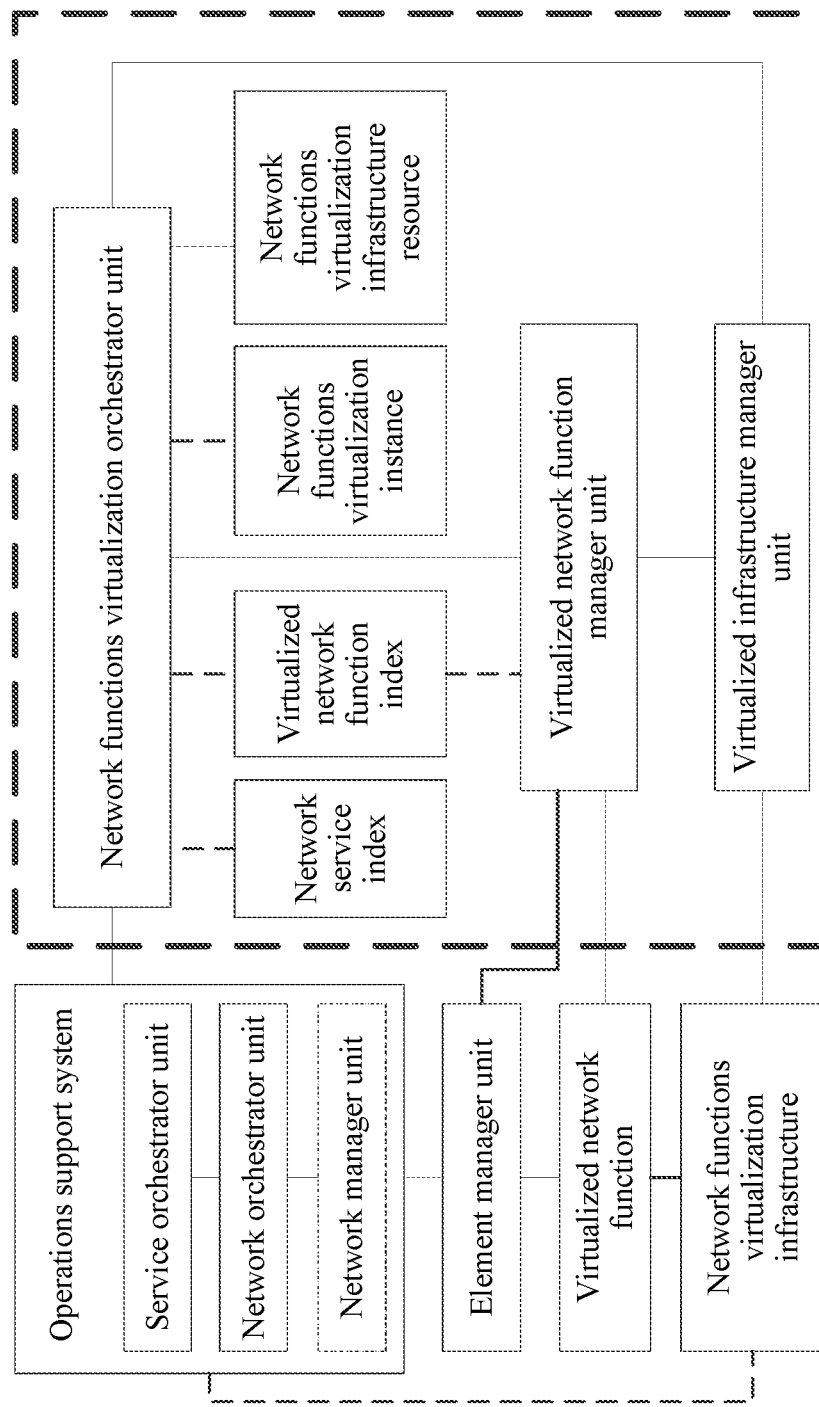
FIG. 2a is a schematic diagram of a possible network architecture according to an embodiment of the present invention.

In the network architecture shown in FIG. 2a, the SO and the NO are separately disposed, and both the SO and the NO are disposed inside an OSS. Optionally, the OSS may further include an NM. The NM may be provided as a standalone entity, or a function of the NM may be integrated into the NO. In the latter case, the NM may be externally presented as a functional module, or the NO may be presented as having the function of the NM.

Figure 2B:
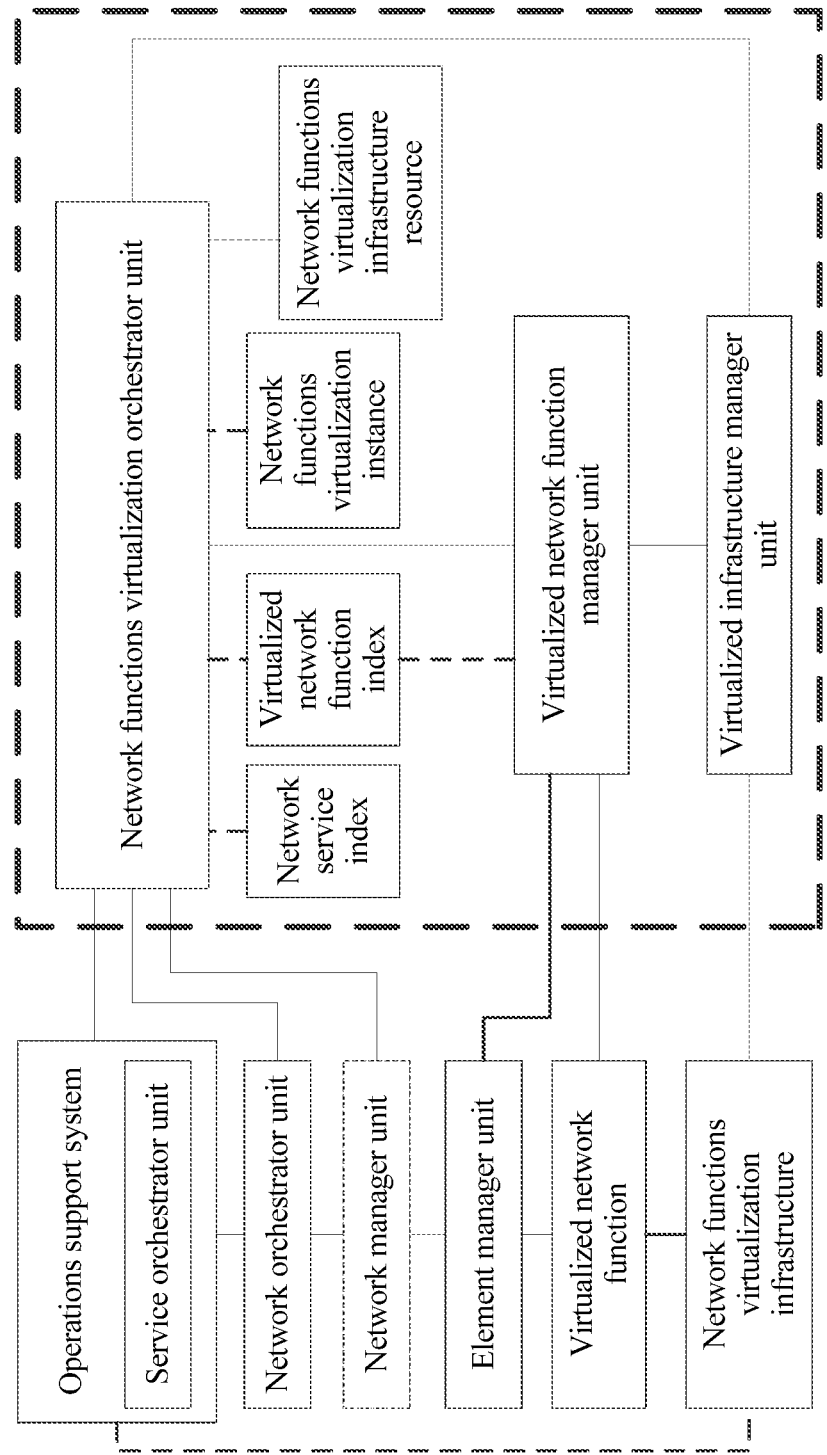
FIG. 2b is a schematic diagram of another possible network architecture according to an embodiment of the present invention.

In the network architecture shown in FIG. 2b, the SO and the NO are separately disposed, the SO is disposed inside an OSS, and the NO is disposed outside the OSS. Optionally, the network architecture shown in FIG. 2b may further include an NM, and the NM is disposed outside the OSS. The NM may be provided as a standalone entity, or a function of the NM may be integrated into the NO or a network manager unit. In the latter case, the NM may be externally presented as a functional module, or the NO or the network manager unit may be presented as having the function of the NM.

Figure 2C:
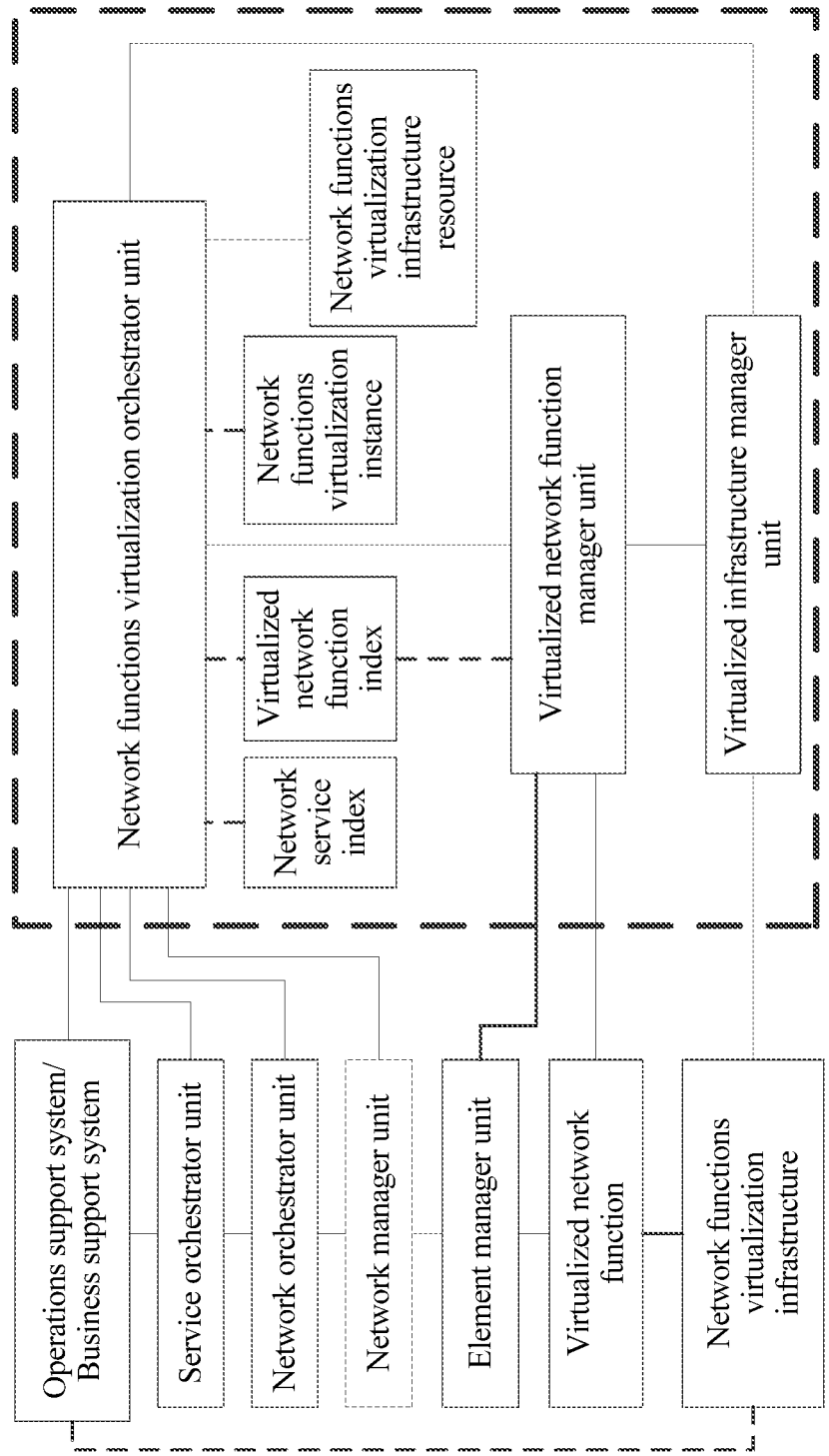
FIG. 2c is a schematic diagram of still another possible network architecture according to an embodiment of the present invention.

In the network architecture shown in FIG. 2c, the SO and the NO are separately disposed, and both the SO and the NO are disposed outside an OSS/BSS. Optionally, the network architecture shown in FIG. 2c may further include an NM. Related content of the NM in FIG. 2c is similar to the description of the NM in FIG. 2b. Refer to detailed description of FIG. 2b. Details are not described herein again.

Figure 2D:
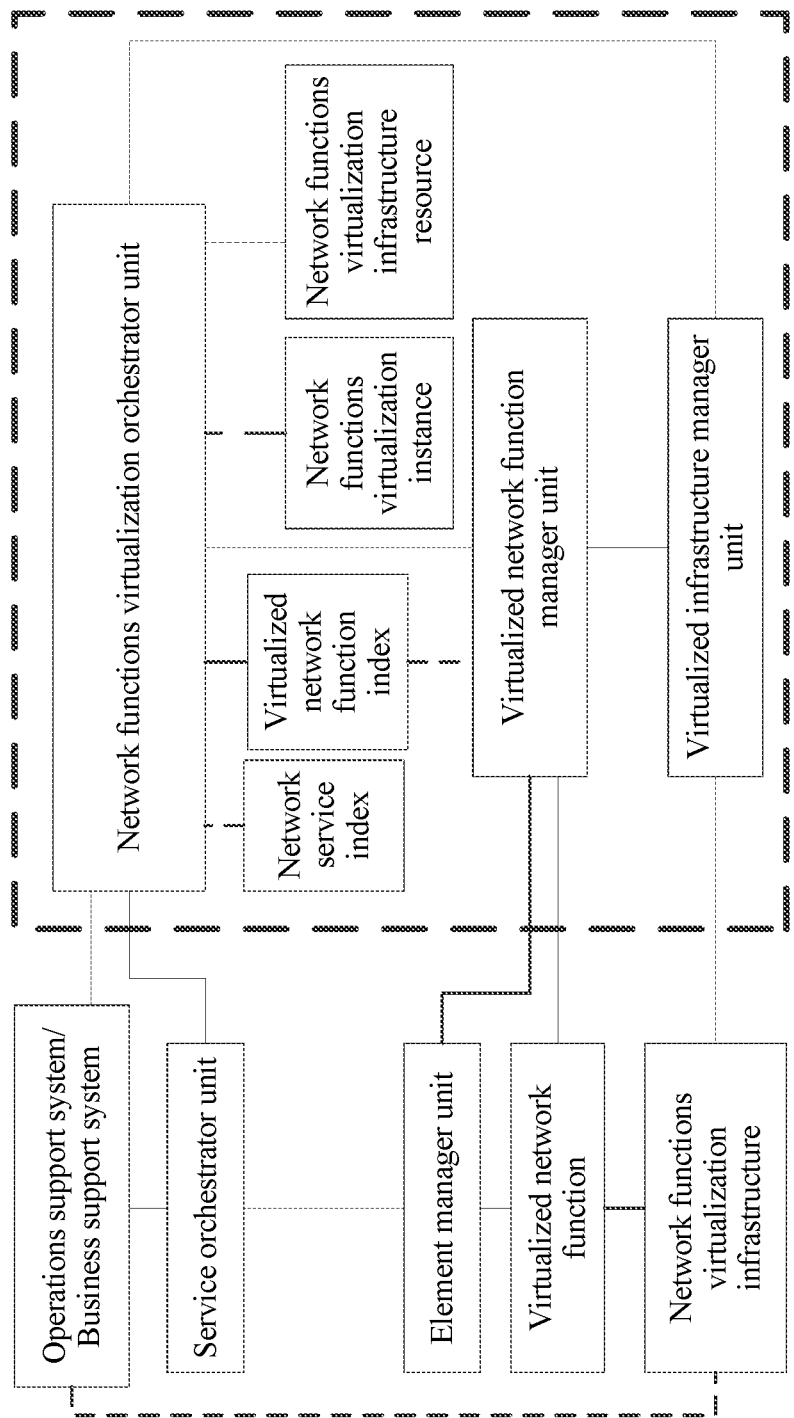
FIG. 2d is a schematic diagram of still another possible network architecture according to an embodiment of the present invention.

In the network architecture shown in FIG. 2d, the SO is disposed outside an OSS/BSS. For the NO, the NO is not provided as a standalone entity, but the function of the NO is integrated into an element manager unit or a network functions virtualization orchestrator unit; or some functions of the NO are integrated into an element manager unit and other functions of the NO are integrated into a network functions virtualization orchestrator unit.

Figure 2E:
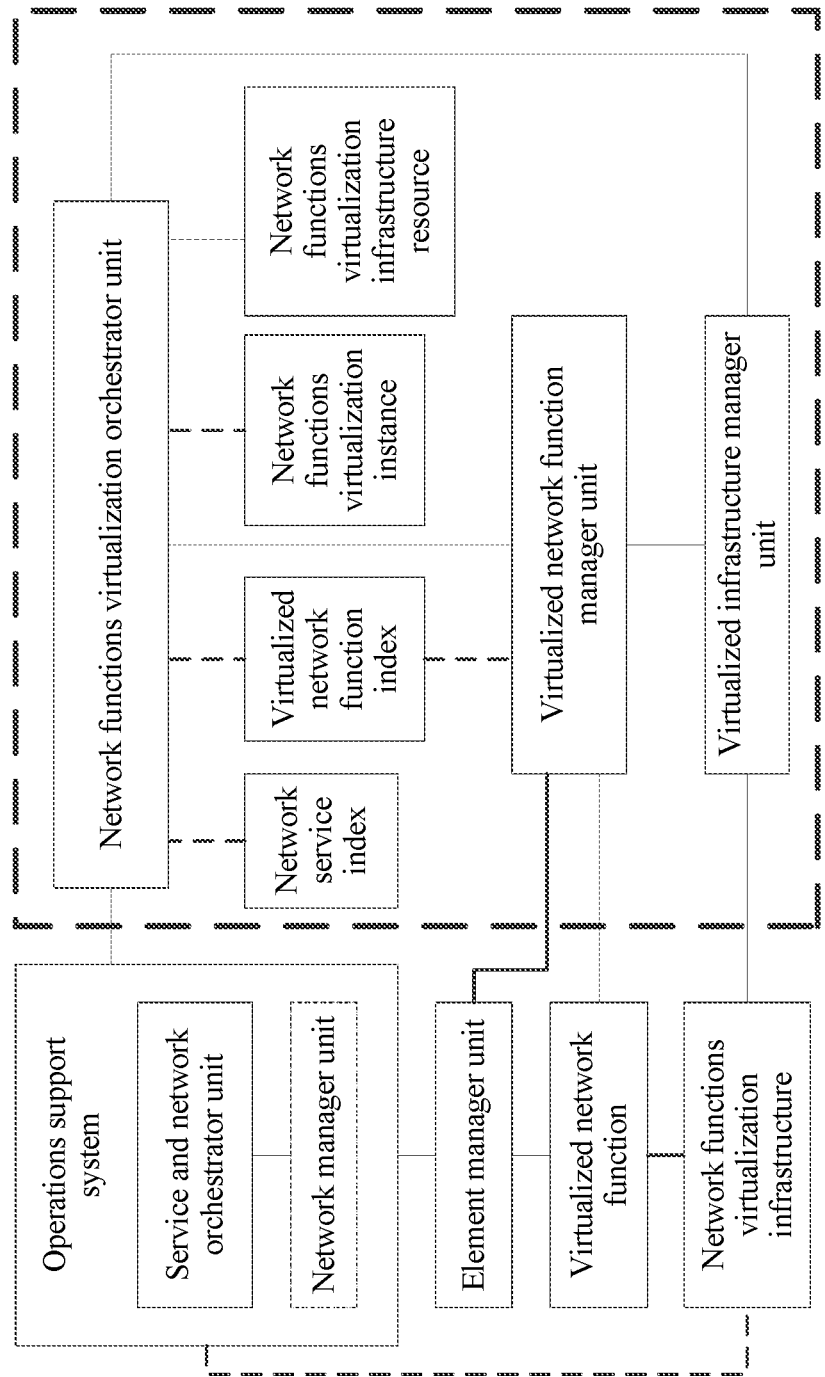
FIG. 2e is a schematic diagram of still another possible network architecture according to an embodiment of the present invention.

In the network architecture shown in FIG. 2e, the SO and the NO are integrated into a service and network orchestrator unit, and the service and network orchestrator unit is disposed inside an OSS. Optionally, the OSS may further include an NM. The NM may be provided as a standalone entity, or a function of the NM may be integrated into the service and network orchestrator unit. In the latter case, the NM may be externally presented as a functional module, or the service and network orchestrator unit may be presented as having the function of the NM. Certainly, the service and network orchestrator unit may be disposed outside an OSS/BSS. This is not limited in this embodiment of the present invention.

The following describes the technical solutions in the embodiments of the present invention based on common aspects in the foregoing embodiments of the present invention.

Figure 3:
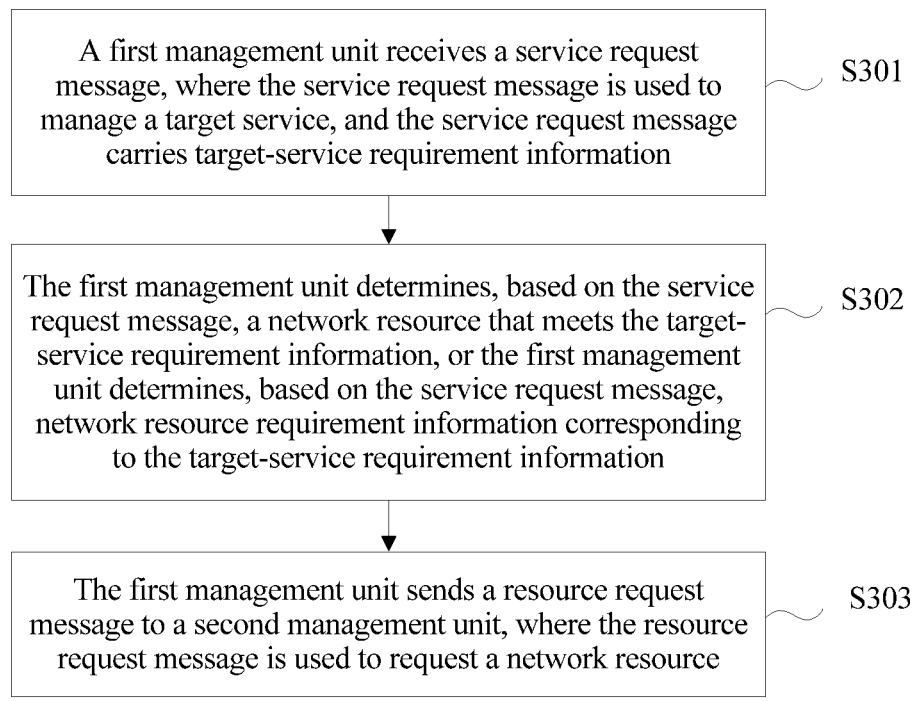
FIG. 3 is a schematic flowchart of a network resource management method according to an embodiment of the present invention.

An embodiment of the present invention provides a network resource management method, and an apparatus and a system based on the method. A first management unit receives a service request message, where the service request message is used to manage a target service, and the service request message carries target-service requirement information. For example, the first management unit may receive a service request message sent by a customer, an OSS, or a BSS. The first management unit determines, based on the service request message, a network resource that meets the target-service requirement information. For example, the first management unit may determine, based on the service request message, a corresponding service template or resource template, where the service template or the resource template includes the network resource. Alternatively, the first management unit determines network resource requirement information corresponding to the target-service requirement information. In addition, the first management unit sends a resource request message to a second management unit, where the resource request message is used to request the network resource, and the resource request message carries the network resource requirement information. For example, the foregoing method may be shown in FIG. 3. The network resource management method may be understood as a network resource orchestration method. The network resource in the method may be hereinafter referred to as a first network resource, and the resource request message in the method may be hereinafter referred to as a first resource request message.

In the solution in this embodiment of the present invention, after receiving the service request message, the first management unit can determine, based on the service request message, the first network resource that meets the target-service requirement information; or determine, based on the service request message, the first network resource requirement information corresponding to the target-service requirement information, and send the first resource request message to the second management unit to request a first network resource. In this way, according to the solution in this embodiment of the present invention, the first network resource can be obtained based on the target-service requirement information. Therefore, automatic orchestration from the target service to the first network resource can be implemented, and dynamically adjusting a network resource becomes less complex.

The foregoing method may be applied to the network architectures shown in FIG. 2a to FIG. 2e. The first management unit may be an SO or a service and network orchestrator unit, and the second management unit may be an NO, a network manager unit, an element manager unit, an NFVO unit, or a resource orchestration (RO) unit. The RO unit is a unit configured to orchestrate and manage a virtual resource. For example, when the method is applied to the network architecture shown in FIG. 2a or FIG. 2b, the first management unit may be an SO, the second management unit may be an NO, and the SO may receive a service request message sent by a customer or a BSS. For another example, when the method is applied to the network architecture shown in FIG. 2c, the first management unit may be an SO, the second management unit may be an NO, and the SO may receive a service request message sent by a customer, an OSS, or a BSS. For another example, when the method is applied to the network architecture shown in FIG. 2d, the first management unit may be an SO, the second management unit may be an element manager unit or a network functions virtualization orchestrator unit, and the SO may receive a service request message sent by a customer, an OSS, or a BSS. For another example, when the method is applied to the network architecture shown in FIG. 2e, the first management unit may be a service and network orchestrator unit, the second management unit may be an element manager unit, and the service and network orchestrator unit may receive a service request message sent by a customer or a BSS.

The following further describes the solutions provided in the embodiments of the present invention with reference to FIG. 4 to FIG. 6D.

Figure 4:
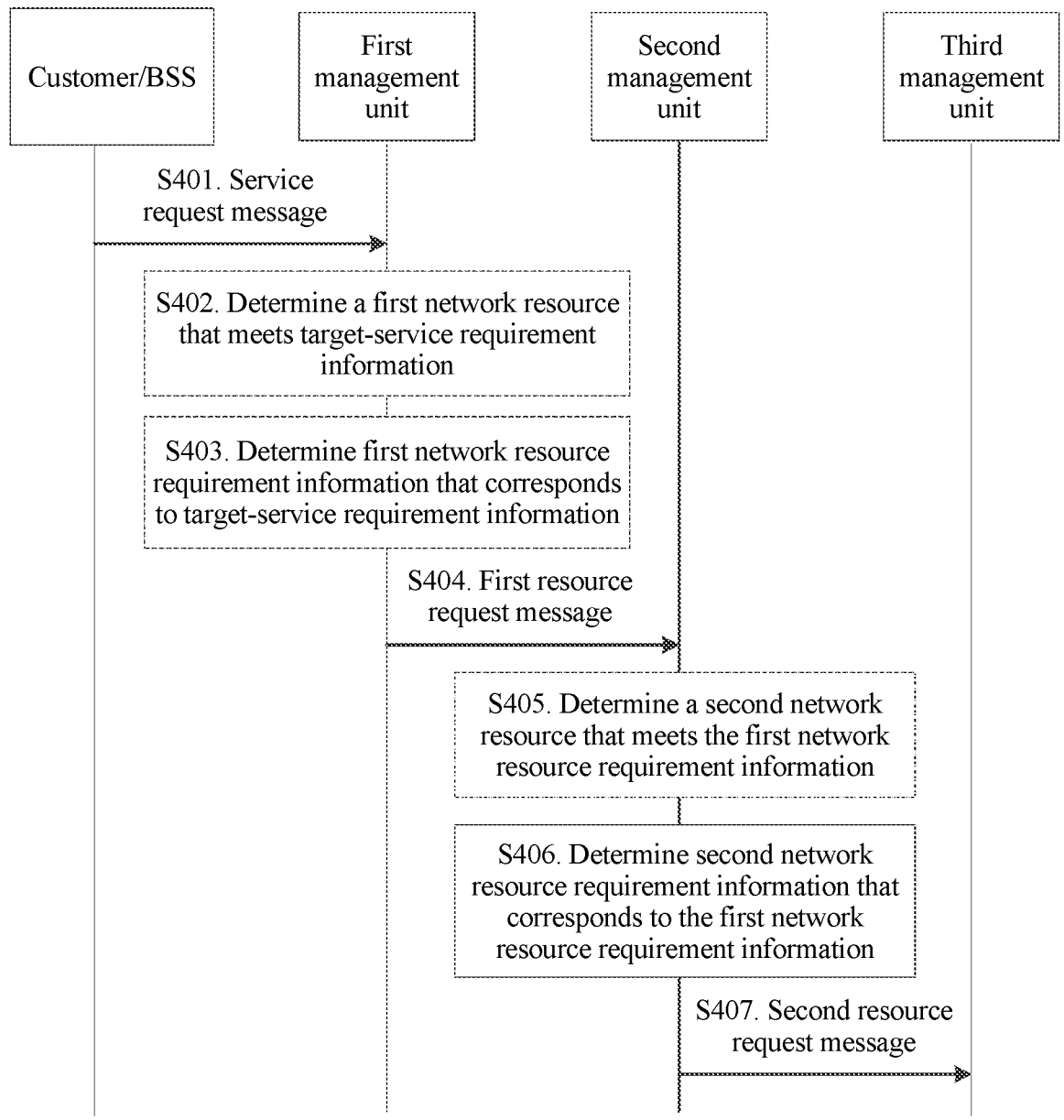
FIG. 4 is a schematic communication diagram of another network resource management method according to an embodiment of the present invention.
Figure 5A:
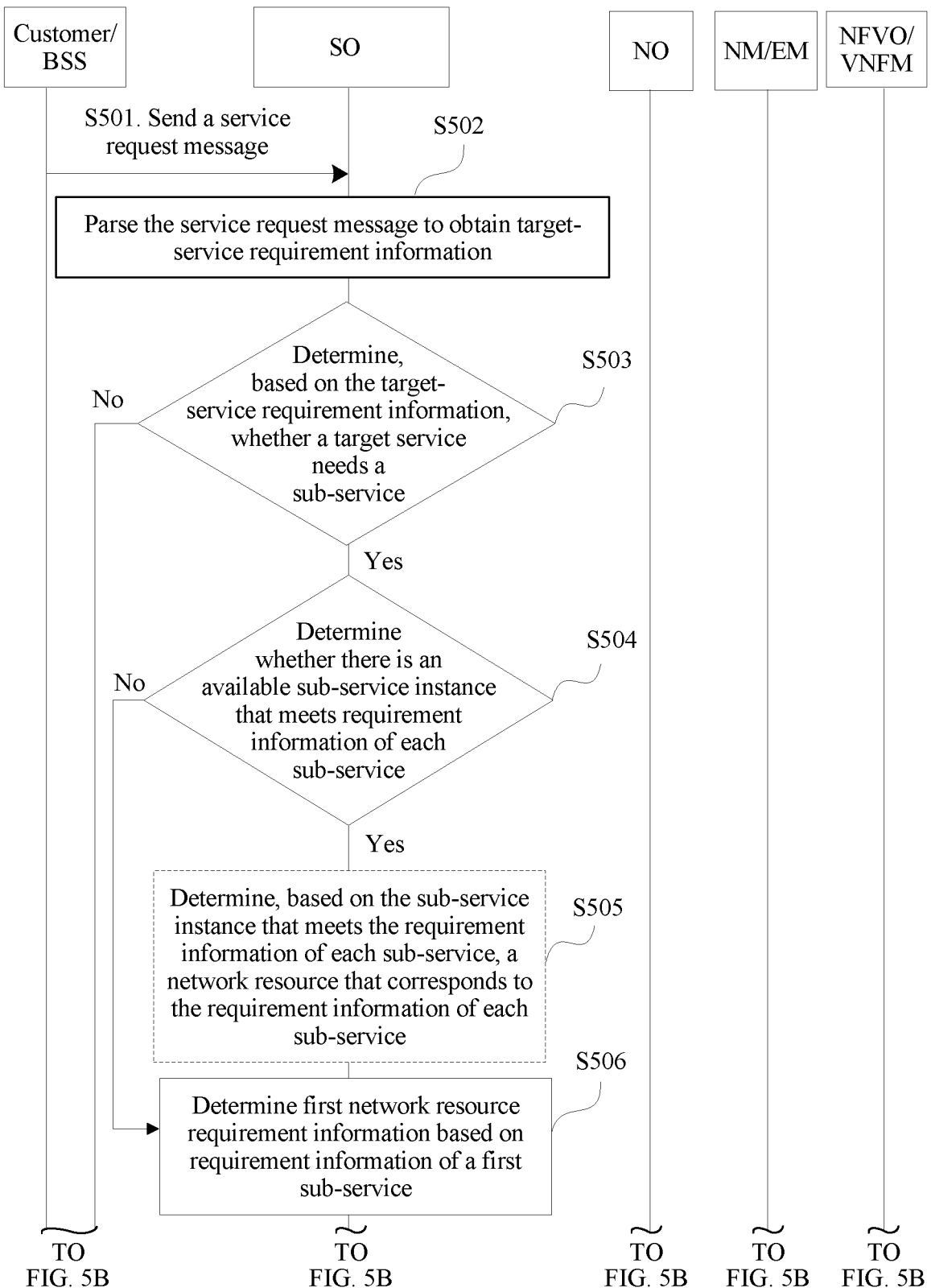
FIG. 5A to FIG. 5E are a schematic communication diagram of still another network resource management method according to an embodiment of the present invention.
Figure 5B:
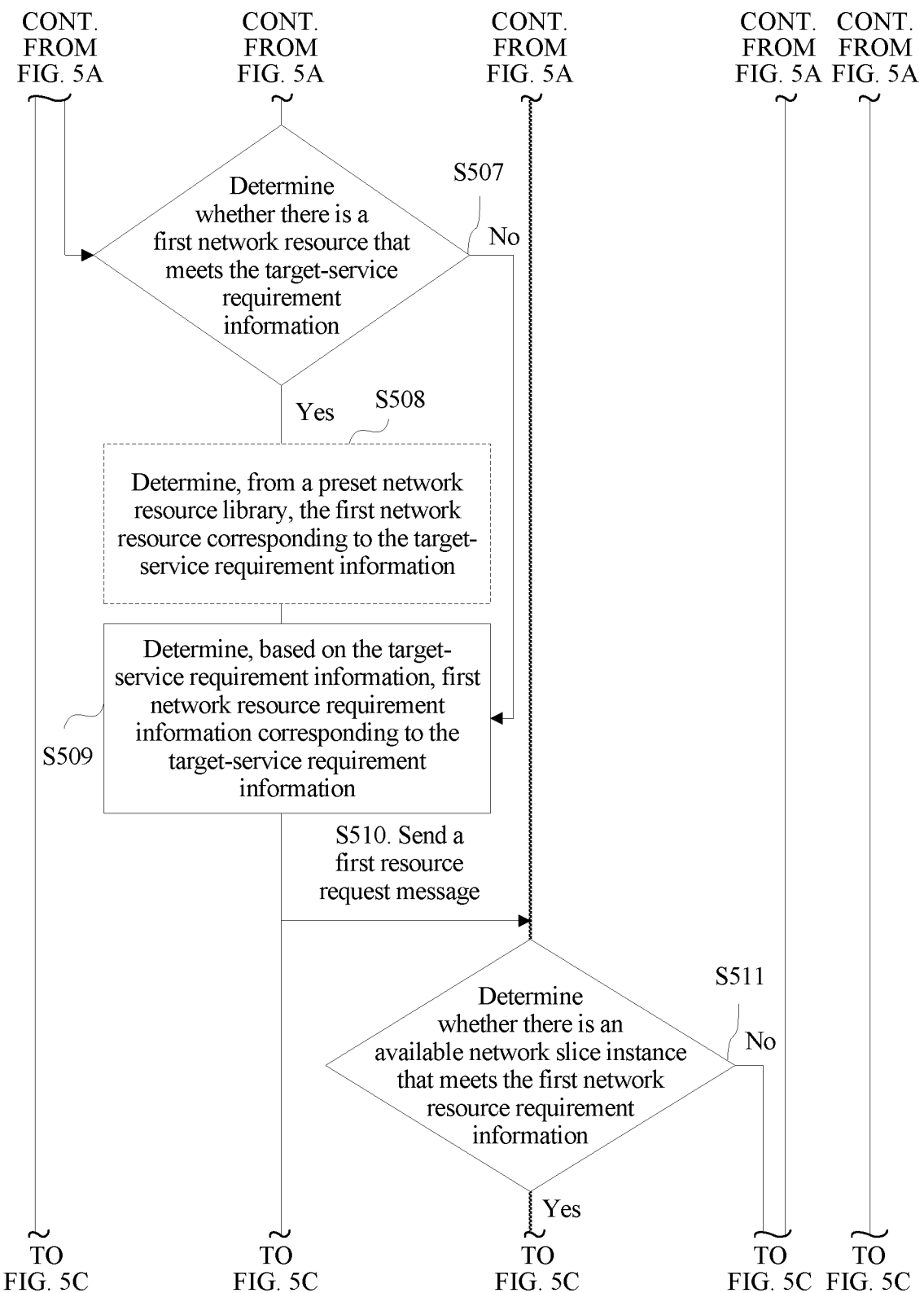
Figure 5C:
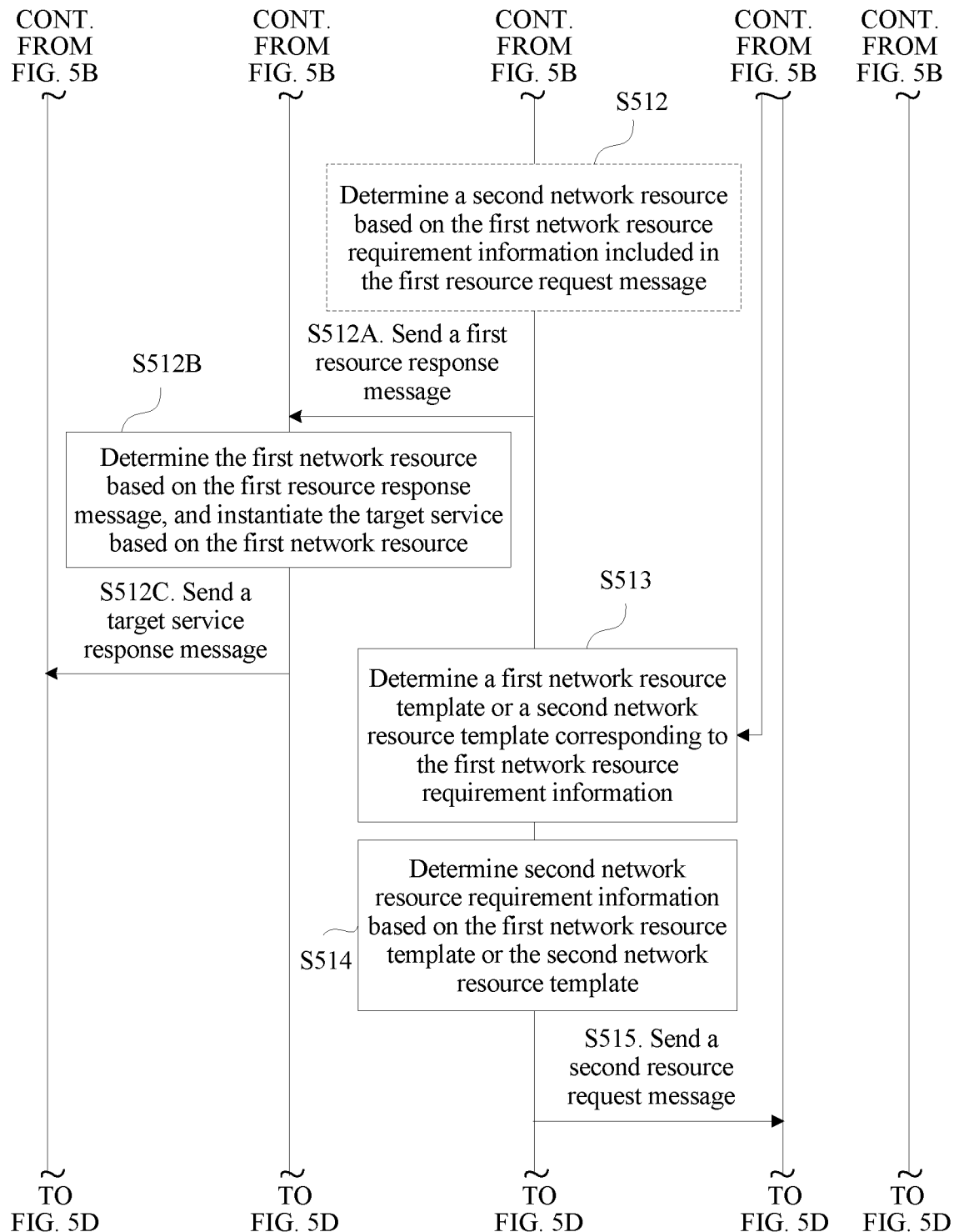
Figure 5D:
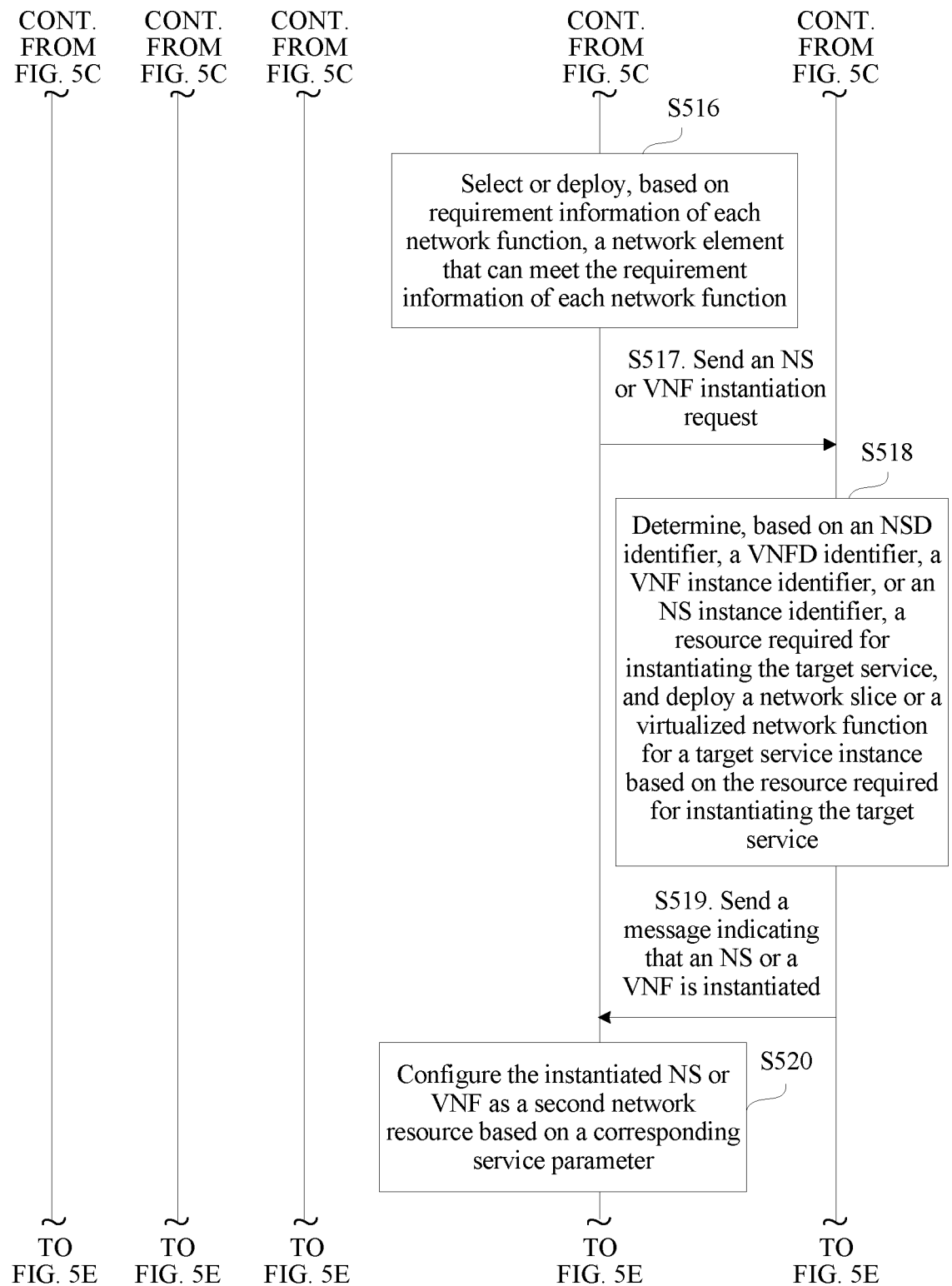
Figure 5E:
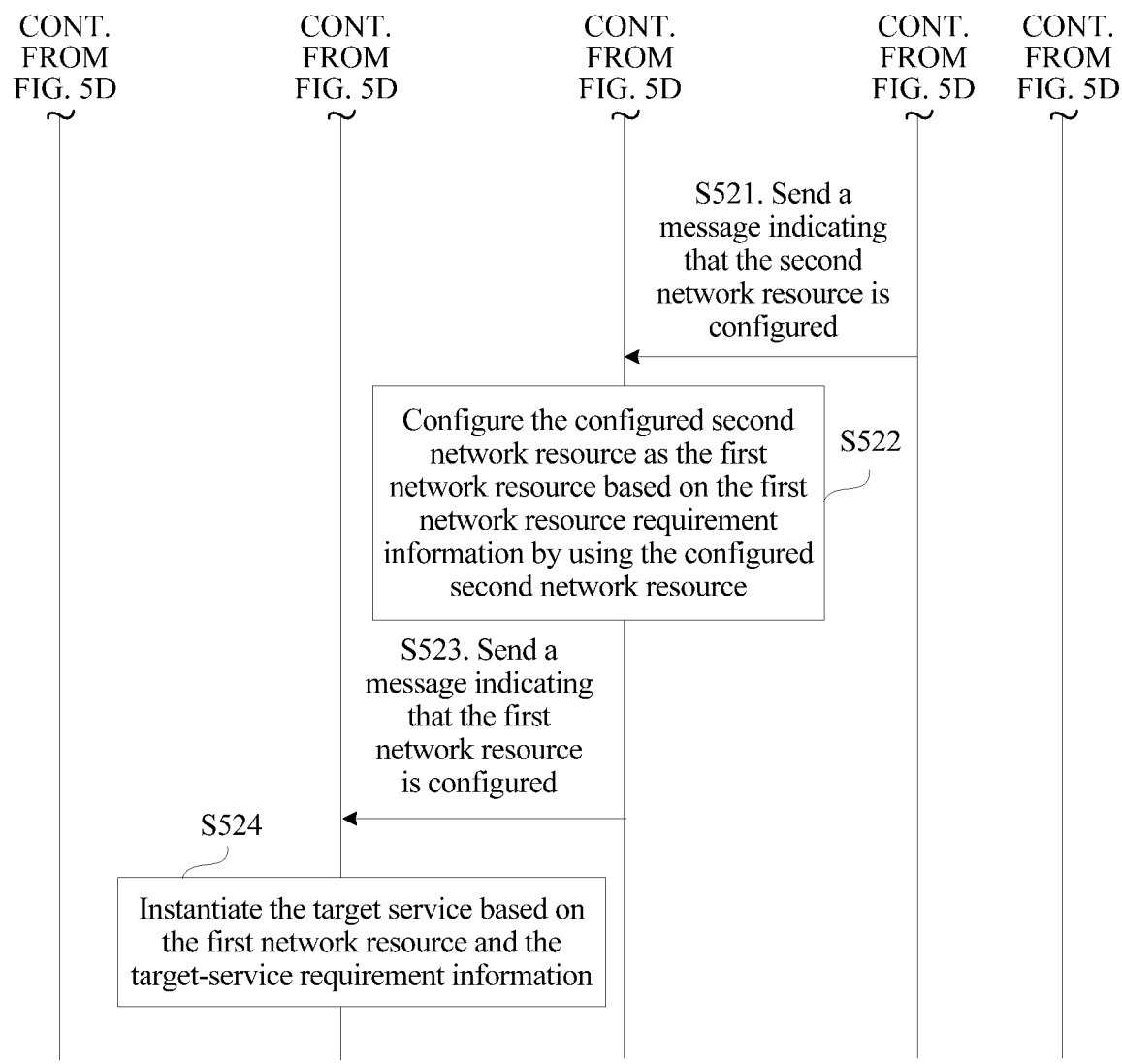
Figure 6A:
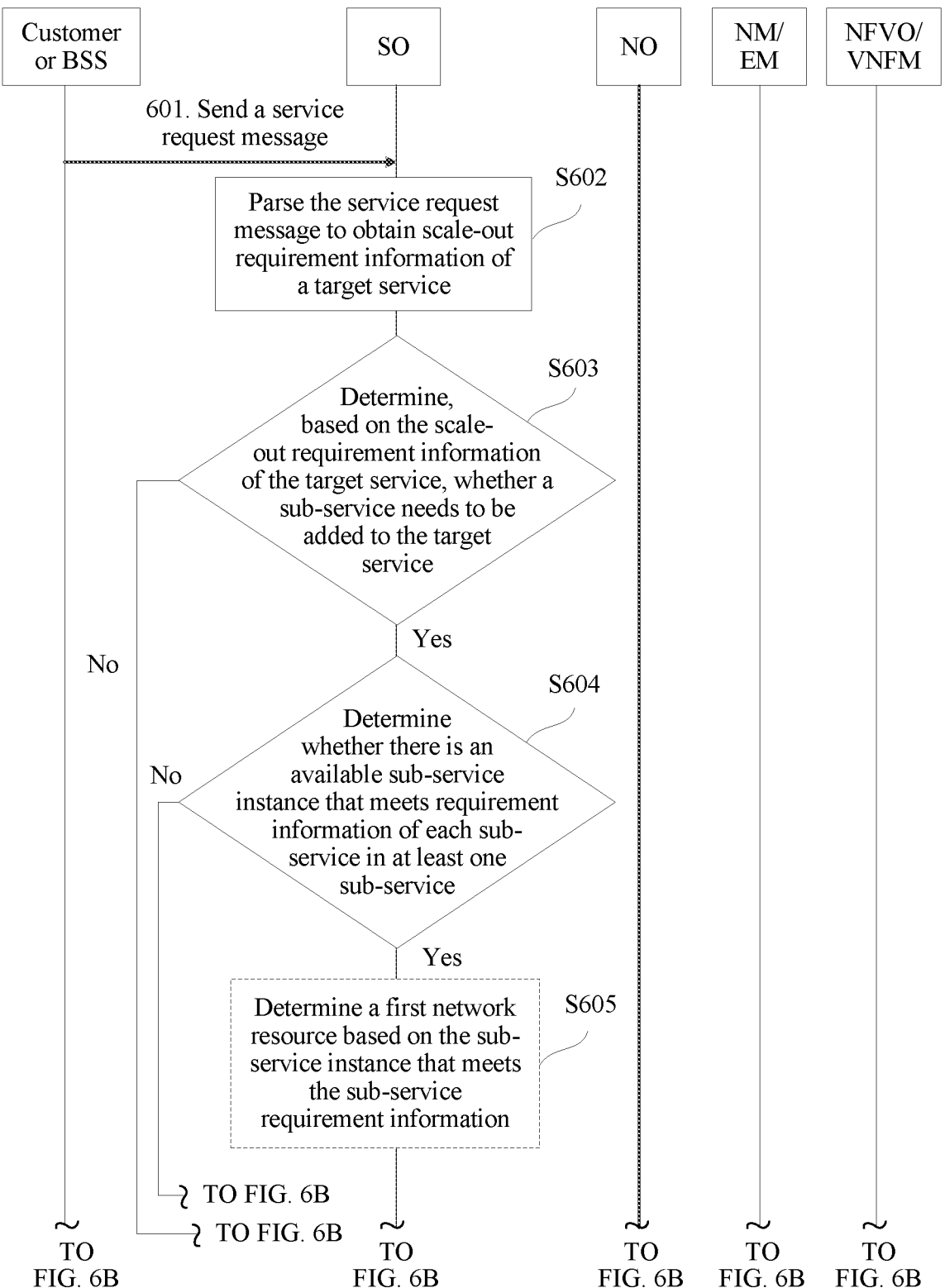
FIG. 6A to FIG. 6D are a schematic communication diagram of still another network resource management method according to an embodiment of the present invention.
Figure 6B:
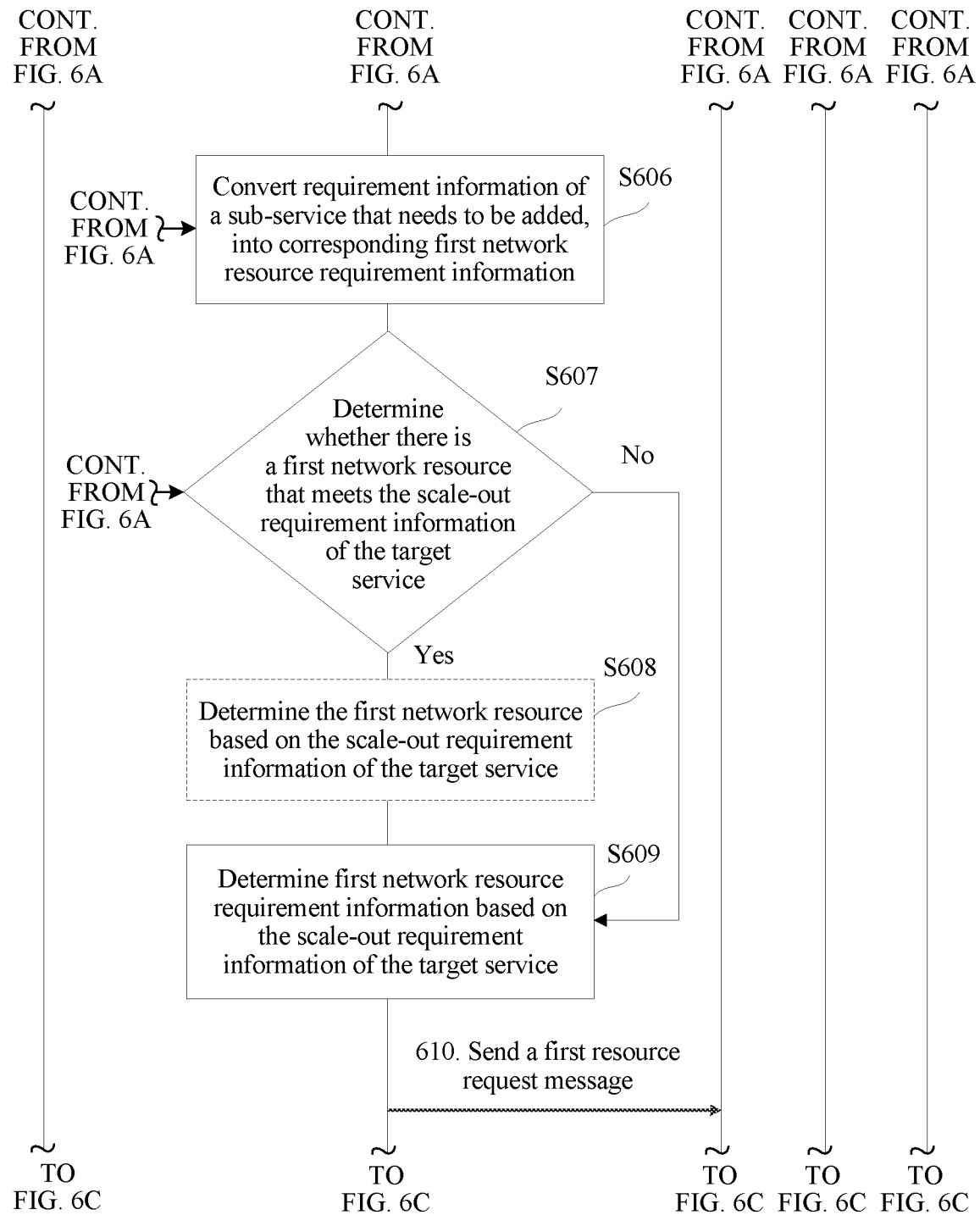
Figure 6C:
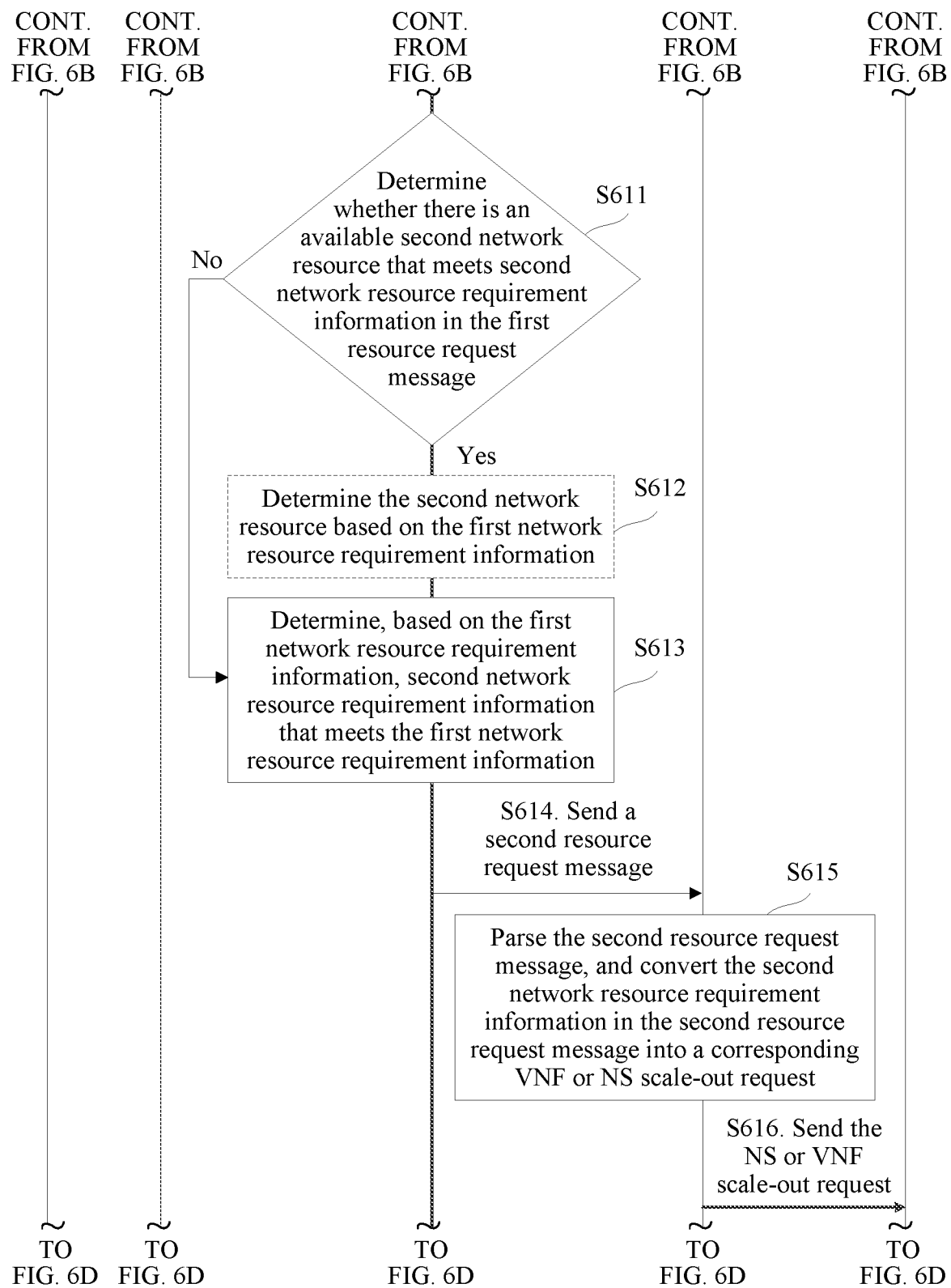
Figure 6D:
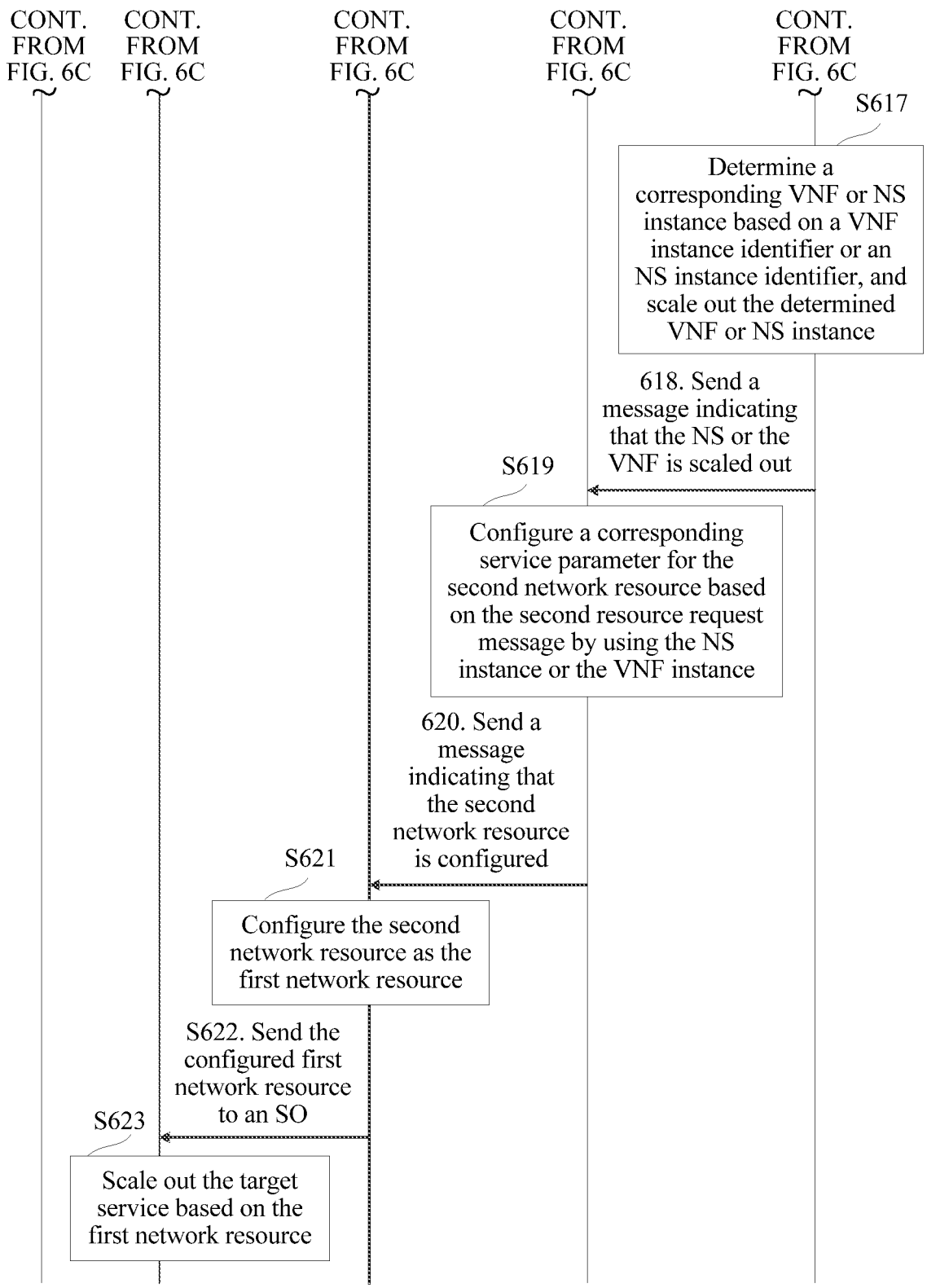

FIG. 4 is a schematic communication diagram of another network resource management method according to an embodiment of the present invention. The method shown in FIG. 4 may be applied to the network architectures shown in FIG. 2a to FIG. 2d. As shown in FIG. 4, the method provided in this embodiment of the present invention includes the following steps.

S401. A customer or a BSS sends a service request message to a first management unit, where the service request message is used to manage a target service, and the service request message carries target-service requirement information.

Optionally, the target-service requirement information includes at least one of a service descriptor identifier, a network resource descriptor identifier, service type information, access control information, an SLA requirement (for example, a latency, coverage, and a traffic model), or a terminal usage type.

Optionally, the management on the target service may include instantiating the target service (to be specific, creating a target service), scaling out the target service (for example, when a function of the target service cannot meet a requirement, adding a sub-service with a specific function to the target service) or scaling in the target service (for example, reducing sub-services of the target service, to reduce some functions of the target service), and the like.

In an example, the customer or the BSS may send, to the first management unit, a service request message for instantiating, scaling out, or scaling in the target service.

For example, the customer or the BSS may send an instantiation request to the first management unit. The instantiation request is used to instantiate the target service. The instantiation request may carry at last one of a type of the target service, an SLA requirement of the target service, or a sub-service component required for the target service. For another example, the customer or the BSS may send a scale-out request or an update request to the first management unit. The scale-out request or the update request is used to scale out or update the target service. The scale-out request or the update request may include an identifier of the target service and scale-out requirement information (for example, an SLA requirement of the target service or a requirement for adding or deleting a sub-service).

In another example, the customer or the BSS may send a service request message to the first management unit. The service request message includes a first template identifier (for example, an ID) and parameter information (for example, operating environment information required for the target service) of the target service. The first template identifier of the target service is used to instruct to obtain the target-service requirement information from a first template of the target service, and the first template of the target service stores the target-service requirement information.

It should be noted that the technical solution provided in this embodiment of the present invention supports the following scenario: After receiving one target service request sent by the customer or the BSS, the first management unit may further receive another target service request sent by the customer or the BSS. For example, after receiving an instantiation request for a target service that is sent by the customer or the BSS, the first management unit may further receive a scale-out request for another target service that is sent by the customer or the BSS.

It may be understood that a connection has been set up between the first management unit and the customer or the BSS before step S401. A specific implementation of setting up the connection is not limited in this embodiment of the present invention.

After step S401 is performed, step S402 or S403 is performed selectively. If step S402 is performed, a procedure of the network resource management method ends after step S402; if step S403 is performed, subsequent steps are performed.

Optionally, before step S402 or S403 is performed, the first management unit may further determine the target-service requirement information that is included in the service request message.

In an example, when the service request message directly carries the target-service requirement information, the first management unit may directly obtain the target-service requirement information from the service request message by parsing the service request message. For example, the service request message carries requirement information used for instantiating the target service.

In another example, when the service request message carries a first template identifier (for example, the first template identifier may be a first template ID) of the target service, the first management unit may obtain, based on the first template identifier of the target service, from templates that is preloaded to the first management unit, a first template corresponding to the first template identifier of the target service. The first template stores corresponding target-service requirement information. In this way, the first management unit may obtain the target-service requirement information from the first template of the target service by parsing the first template of the target service. For example, the customer or the BSS sends an instantiation request to the first management unit. The instantiation request includes a first template ID and parameter information of a target service. The first management unit may obtain, based on the first template ID of the target service, from templates of the target service that is preloaded to the first management unit, the first template of the target service corresponding to the first template identifier of the target service. The first template stores corresponding requirement information for instantiating the target service. Then, the first management unit parses the first template of the target service, to determine the requirement information for instantiating the target service, for example, a type of the target service, SLA information of the target service, and a sub-service component required for the target service. For another example, the customer or the BSS sends a scale-out request to the first management unit. The scale-out request includes a target service instance identifier and a first template ID of the target service. The first management unit obtains, based on the first template ID of the target service that is in the scale-out request, from templates of the target service that is preloaded to the first management unit, the first template of the target service corresponding to the first template identifier of the target service. The first template stores requirement information such as SLA information of the target service and addition or deletion of a sub-service component. Then, the first management unit may parse the first template of the target service, to obtain the target-service requirement information.

Optionally, before step S402 or step S403, the first management unit may further determine whether there is a first network resource that meets the target-service requirement information.

It should be noted that when the first management unit determines that there is a network resource that meets the target-service requirement information, the first management unit performs step S402. Alternatively, when the first management unit determines that there is no network resource that meets the target-service requirement information, the first management unit performs step S403. Alternatively, when the first management unit determines that there is a part of network resource that meets the target-service requirement information but the target service cannot be implemented by using the part of network resource, the first management unit performs step S403.

S402. The first management unit determines a first network resource that meets the target-service requirement information.

For example, the first management unit may select, from an existing network resource based on the target-service requirement information, the first network resource that meets the target-service requirement information. The first network resource may be implemented by combining functions that correspond to a plurality of network resources, or may be a first network resource that can directly meet the target-service requirement information.

For another example, the first management unit may determine a corresponding service template or resource template based on the service request message, and the service template or the resource template includes the network resource.

When determining that there is a network resource that meets the target-service requirement information, the first management unit may directly feed back the first network resource to the customer or the BSS.

S403. The first management unit determines, based on the service request message, network resource requirement information corresponding to the target-service requirement information.

The following embodiment of the present invention describes, with reference to steps S4031A and S4032A, a specific implementation of step S403 when the target service does not include a sub-service, and describes, with reference to steps S4031B and S4032B, a specific implementation of step S403 when the target service includes a sub-service.

Optionally, when the target service does not include a sub-service, step S403 may be implemented in the following manners.

S4031A. The first management unit obtains a target service template or a network resource template, where the target service template or the network resource template corresponds to the target-service requirement information, the target service template includes indication information or the network resource requirement information, and the indication information is used to obtain the network resource requirement information.

For example, after obtaining the target-service requirement information, the first management unit first determines whether there is an available target service instance that meets the target-service requirement information. When determining that there is no available target service instance that meets the target-service requirement information, the first management unit obtains a target service template or a network resource template based on the target-service requirement information, where the target service template or the network resource template meets the target-service requirement information, the target service template includes indication information or the network resource requirement information, and the indication information is used to instruct to obtain the network resource requirement information.

If the first management unit determines that there is an available target service instance that meets the target-service requirement information, the first management unit determines a first network resource based on the target service instance that meets the target-service requirement information, and sends the first network resource to the customer or the BSS.

Because requirement information carried in the network resource template may be used to indicate only a type of a required network resource (for example, a type used to implement a voice call function), while actually required network resource requirement information may include a specific required network resource (for example, a network resource A and a network resource B, where the network resource A and the network resource B are used to implement the foregoing voice call function), the network resource requirement information needs to be determined with reference to a specific parameter carried in the service request message. The specific parameter may be, for example, operating environment information and the like.

Optionally, the target service template may be a target service descriptor and used to instruct to instantiate the target service.

Optionally, the network resource template may be a network resource descriptor and used to instruct to instantiate the network resource.

In an example, when a request message for a target service includes target-service requirement information, the first management unit may obtain a corresponding target service template or network resource template based on the target-service requirement information.

In another example, when a request message for a target service includes a first template identifier of the target service, the first management unit may obtain, based on the first template identifier of the target service, a template identifier of the target service corresponding to the first template identifier of the target service, and then determine the target service template based on the template identifier of the target service.

In still another example, the first management unit may determine, based on the target-service requirement information by using a resource decomposition algorithm, the network resource requirement information that meets the target-service requirement information. The network resource requirement information may be requirement information of a network function, or may be requirement information of a network slice, or may be requirement information of a network element. The resource decomposition algorithm is used to directly or indirectly decompose the target service into the network resource requirement information.

S4032A. The first management unit determines the network resource requirement information based on the target service template or the network resource template.

For example, the network resource requirement information is stored in the target service template or the network resource template, and the first management unit may obtain the network resource requirement information from the determined target service template by parsing the target service template or the network resource template.

It should be noted that the first management unit may determine, based on the target-service requirement information by using a resource decomposition algorithm, the network resource requirement information that meets the target-service requirement information. The network resource requirement information may be requirement information of a network function, or may be requirement information of a network slice, or may be requirement information of a network element. The resource decomposition algorithm is used to directly or indirectly decompose the target service into the network resource requirement information.

Optionally, when the target service includes a sub-service, step S403 may be implemented in the following manners.

S4031B. The first management unit determines sub-service requirement information of the target service based on the service request message.

S4032B. The first management unit determines the network resource requirement information based on the sub-service requirement information.

For example, when determining that the target service includes a sub-service, the first management unit first determines whether there is an available sub-service instance that meets requirement information of each sub-service. When determining that there is no available sub-service instance that meets requirement information of a specific sub-service, the first management unit obtains a sub-service template or a network resource template based on the sub-service requirement information. The sub-service template or the network resource template meets the sub-service requirement information, the sub-service template includes indication information or the network resource requirement information, and the indication information is used to instruct to obtain the network resource requirement information.

It should be noted that when the target service includes a first part of sub-services and a second part of sub-services, when the first management unit determines that an existing sub-service instance can meet requirement information of the first part of sub-services, but cannot meet requirement information of the second part of sub-services, the first management unit needs to determine the network resource requirement information simply based on the requirement information of the second part of sub-services. In this way, time spent in orchestration from the target service to the network resource can be shortened, and a system operating speed can be improved.

Optionally, in this embodiment of the present invention, before step S403, the method may further include the following steps: The first management unit determines, based on the service request message, whether the target service includes a sub-service, and if the first management unit determines that the target service does not include a sub-service, steps S4031A and S4032A may be performed, or if the first management unit determines that the target service includes a sub-service, steps S4031B and S4032B may be performed. When the target-service requirement information includes a sub-service, a function that can be implemented by using the network resource requested by the network resource requirement information that is determined by the first management unit based on the service request message should be addition of functions that need to be implemented by using the network resources requested by the requirement information of all sub-services.

S404. The first management unit sends a first resource request message to a second management unit, where the first resource request message is used to request a first network resource, and the first resource request message carries first network resource requirement information.

Optionally, the first network resource in this embodiment of the present invention includes at least any one of a network slice, a network function, a transmission resource, or a network element.

After step S404 is performed, step S405 or S406 is performed selectively. If step S405 is performed, the method procedure ends after step S405; if step S406 is performed, subsequent steps are performed.

Optionally, before step S405 or step S406 is performed, the second management unit may further determine whether there is a second network resource that meets the first network resource requirement information.

For example, when the second management unit determines that there is a second network resource that meets the first network resource requirement information, the second management unit performs step S405; when the second management unit determines that there is no second network resource that meets the first network resource requirement information, the second management unit performs step S406.

S405. The second management unit determines a second network resource that meets the first network resource requirement information.

For example, the first management unit selects, from an existing network resource based on the first network resource requirement information, a second network resource that can meet the first network resource requirement information. The second network resource may be implemented by combining functions that correspond to a plurality of network resources, or may be a second network resource that can directly meet the first network resource requirement information.

For example, in the network management system provided in this embodiment of the present invention, when determining that there is a second network resource that meets the first network resource requirement information, the second management unit sends the second network resource that meets the first network resource requirement information to the first management unit.

S406. The second management unit determines, based on the first resource request message, second network resource requirement information corresponding to the first network resource requirement information.

For example, step S406 may be implemented in the following manners.

S4061. The second management unit obtains a first network resource template or a second network resource template based on the first resource request message, where the first network resource template or the second network resource template corresponds to the first network resource requirement information, the first network resource template includes second indication information or the second network resource requirement information, and the second indication information is used to obtain the second network resource requirement information.

S4062. The second management unit determines the second network resource requirement information based on the first network resource template or the second network resource template.

The second network resource requirement information is stored in the first network resource template or the second network resource template. The second management unit may obtain the second network resource requirement information from the first network resource template or the second network resource template by parsing the first network resource template or the second network resource template.

In an example, in this embodiment of the present invention, the first network resource requirement information may be decomposed by using a resource decomposition algorithm, to determine the second network resource requirement information that meets the first network resource requirement information.

In another example, in this embodiment of the present invention, after receiving the first resource request message sent by the first management unit, the second management unit may first determine whether there is an available second network resource that meets the first network resource requirement information. When determining that there is no second network resource that meets the first network resource requirement information, the second management unit determines the first network resource template or the second network resource template, where the first network resource template or the second network resource template meets the first network resource requirement information, the first network resource template includes the second indication information or the second network resource requirement information. The second management unit decomposes the first network resource template or the second network resource template into one or more pieces of second network resource requirement information, and determines a connection requirement between the second network resources included in a plurality of pieces of second network resource requirement information.

S407. The second management unit sends a second resource request message to a third management unit, where the second resource request message is used to request the second network resource, and the second resource request message carries the second network resource requirement information.

The third management unit in this embodiment of the present invention may be a network manager unit, an element manager unit, a network functions virtualization orchestrator unit, or a virtualized network function manager unit.

Optionally, in this embodiment of the present invention, the first network resource may include a network slice, a network function, a network service, a transmission resource, or a network element. Alternatively, the first network resource may include a network slice, and the second network resource includes at least any one of a network function, a transmission resource, a network service, or a network element.

According to the solution in this embodiment of the present invention, after receiving the service request message, the first management unit can determine, based on the service request message, the first network resource that meets the target-service requirement information; or determine, based on the service request message, the first network resource requirement information corresponding to the target-service requirement information, and send the first resource request message to the second management unit to request a first network resource. In this way, according to the solution in this embodiment of the present invention, the first network resource can be obtained based on the target-service requirement information. Therefore, automatic orchestration from the target service to the first network resource can be implemented, and dynamically adjusting a network resource becomes less complex. Further, the second management unit can determine, based on the first resource request message sent by the first management unit, the second network resource that meets the first network resource requirement information; or determine, based on the first resource request message sent by the first management unit, the second network resource requirement information corresponding to the first network resource requirement information and send the second resource request message to the third management unit to request a second network resource. In this way, according to the solution in this embodiment of the present invention, the second network resource can be obtained based on the first network resource requirement information. Therefore, automatic orchestration from the first network resource requirement information to the second network resource can be implemented. It can be learned that according to the solution in this embodiment of the present invention, dynamically adjusting a network resource becomes less complex through interaction between the first management unit and the second management unit.

Further, in this embodiment of the present invention, a granularity of orchestration is per communications resource. Therefore, in this technical solution, the target-service requirement information that is carried in the service request message can be automatically decomposed to some extent and be ultimately decomposed into creation requests and configuration data of a plurality of network elements and the like, and TTM (Time To Market) time is shortened. In this embodiment of the present invention, in a network operation scenario, management and orchestration are performed by an SO and an NO in a layer-wise manner, to automatically generate a plurality of network resources for the target service. In addition, the layer-wise management by the SO and the NO simplifies service orchestration, network resource orchestration, and network maintenance.

It should be noted that in this embodiment of the present invention, when the second management unit directly communicates with an NFVO, the second network resource may further include a network service.

It should be noted that in this embodiment of the present invention, after step S401 is performed, the SO may first determine the first network resource requirement information based on the target-service requirement information that is carried in the request message for the target service, and then determine whether there is a network resource that meets the first network resource requirement information. If there is a network resource that meets the first network resource requirement information, the SO performs step S402, or if there is no network resource that meets the first network resource requirement information, the SO performs step S404. Alternatively, the SO may perform steps S402 and S403. To be specific, the SO first determines, based on the target-service requirement information that is carried in the request message for the target service, whether there is a network resource that meets the target-service requirement information, and if there is a network resource that meets the target-service requirement information, the SO performs step S402, or if there is no network resource that meets the target-service requirement information, the SO performs step S403.

Likewise, after the NO receives the first resource request message sent by the SO, the NO may first determine the second network resource requirement information based on the first network resource requirement information in the first resource request message, and then determine whether there is a second network resource that meets the second network resource requirement information. If the NO determines that there is a second network resource that meets the second network resource requirement information, the NO performs step S405, or if the NO determines that there is no second network resource that meets the second network resource requirement information, the NO performs step S406.

As shown in FIG. 5A to FIG. 5E, instantiating a target service on a network management system is described by using an example in which target-service requirement information is target service instantiation information in this embodiment. The description is provided by using an example in which a first management unit is an SO and a second management unit is an NO.

Specifically, procedure steps of the service are as follows.

S501. A customer or a BSS sends, to the SO, a service request message for instantiating a target service, where the service request message for instantiating the target service includes target-service requirement information.

For example, the target-service requirement information may include a type of the target service, an SLA requirement, sub-services required for the target service, or the like.

S502. The SO parses the service request message for instantiating the target service, to obtain the target-service requirement information.

For a specific manner of obtaining the target-service requirement information by the SO, refer to the foregoing embodiments. Details are not described in this embodiment of the present invention again.

S503. The SO determines, based on the target-service requirement information, whether the target service needs a sub-service, where one sub-service corresponds to one piece of sub-service requirement information.

A manner of determining, by the SO based on the target-service requirement information, whether the target service needs a sub-service in this embodiment of the present invention is not limited in this embodiment of the present invention.

After step S503 is performed, step S504 or S507 is performed selectively. When the target-service requirement information includes a sub-service, the SO performs steps S504 and S505, or the SO performs S504, S506, S510, and subsequent steps. After the SO performs step S505, the SO instantiates the target service, and sends, to the BSS, a target service response message that is used to indicate that the target service is instantiated. So far, the network resource management method ends.

When the target-service requirement information does not include a sub-service, the SO performs step S507 and continues to perform subsequent steps.

S504. If the SO determines that the target service needs a sub-service, the SO determines whether there is an available sub-service instance that meets requirement information of each sub-service.

It may be understood that in this embodiment of the present invention, a plurality of sub-service instances are prestored in the SO, and one sub-service instance is used to meet a function corresponding to one piece of sub-service requirement information.

After step S504 is performed, step S505 or S506 is performed selectively. If step S505 is performed, the method procedure ends after step S505; if step S506 is performed, subsequent steps are performed.

S505. If the SO determines that there is a sub-service instance that meets the requirement information of each sub-service, the SO determines, based on the sub-service instance that meets the requirement information of each sub-service, a network resource corresponding to the requirement information of each sub-service.

For example, when the SO determines that there is a corresponding network resource that meets the requirement information of each sub-service, the SO instantiates the target service based on the existing corresponding network resource that meets the requirement information of each sub-service.

S506. If the SO determines that there is no sub-service instance that meets requirement information of a first sub-service, the SO determines first network resource requirement information based on the requirement information of the first sub-service, where the first network resource requirement information is used to request a first network resource, and the first sub-service is any one of sub-services included in the target service.

After S506 is performed, the SO continues to perform S510 and steps following S510.

The first network resource includes at least any one of a network slice, a network, a network function, a transmission resource, a network element, or a network service.

It should be noted that when the target service includes a plurality of sub-services, the target service is converted into a plurality of pieces of corresponding network resource requirement information based on the requirement information of each sub-service or a template of each sub-service, and then the plurality of pieces of corresponding network resource requirement information are aggregated to determine the first network resource requirement information.

It may be understood that when the target service includes a plurality of sub-services, if there is an available sub-service instance that meets requirement information of some sub-services in the NO, and there is no available sub-service instance that meets requirement information of other sub-services in the NO, the sub-services for which there is an available sub-service instance may directly use the corresponding sub-service instance. In this case, only requirement information of the sub-services whose requirement information cannot be met is converted into the corresponding first network resource requirement information.

S507. If the SO determines that the target service needs no sub-service, the SO determines, based on the target-service requirement information, whether there is a first network resource that meets the target-service requirement information.

It should be noted that when the SO determines that there is a network resource that meets the target-service requirement information, the SO performs step S508, and a procedure of the network resource management method ends after step S508 is performed. Alternatively, when the SO determines that there is no network resource that meets the target-service requirement information, the SO performs step S509 and subsequent steps. Alternatively, when the SO determines that there is a part of network resource that meets the target-service requirement information but the target service cannot be implemented by using the part of network resource, the SO performs step S509.

S508. If the SO determines that there is a first network resource that meets the target-service requirement information, the SO determines, from an existing network resource library, the first network resource corresponding to the target-service requirement information.

S509. If the SO determines that there is no first network resource that meets the target-service requirement information, the SO determines, based on the target-service requirement information, first network resource requirement information corresponding to the target-service requirement information.

For a manner of obtaining first network resource requirement information based on the target-service requirement information by the SO when the target service needs no sub-service, refer to the foregoing embodiments. Details are not described in this embodiment of the present invention again.

S510. The SO sends a first resource request message to the NO, where the first resource request message is used to request the first network resource, and the first resource request message carries the first network resource requirement information.

S511. The NO determines, based on the first resource request message, whether there is a network slice instance that meets the first network resource requirement information carried in the first resource request message.

Optionally, after step S511 is performed, the NO may selectively perform step S512 or S513. For example, when the NO determines that there is a second network resource that meets the first network resource requirement information, the NO performs steps S512 and S512A to S512C; when the NO determines that there is no second network resource that meets the first network resource requirement information, the NO performs step S513 and subsequent steps S514 to S524.

S512. If the NO determines that there is a network slice instance that meets the first network resource requirement information carried in the first resource request message, the NO determines a second network resource based on the first network resource requirement information included in the first resource request message.

For example, the SO selects, from an existing network resource based on the first network resource requirement information, a second network resource (for example, a network slice instance) that can meet the first network resource requirement information. The second network resource may be implemented by combining functions that correspond to a plurality of network resources, or may be a second network resource that can directly meet the first network resource requirement information.

S512A. The NO sends a first resource response message to the SO, where the first resource response message includes the second network resource.

S512B. The SO determines the first network resource based on the first resource response message, and instantiates the target service based on the first network resource.

S512C. The SO sends, to the BSS, a target service response message that is used to indicate that the target service is instantiated.

For example, in a network management system provided in this embodiment of the present invention, when determining that there is a network slice instance that meets the first network resource requirement information, the NO sends the network slice instance that meets the first network resource requirement information to the SO.

S513. If the NO determines that there is no network slice instance that meets the first network resource requirement information, the NO determines a first network resource template or a second network resource template based on the first network resource requirement information included in the first resource request message, where the first network resource template or the second network resource template corresponds to the first network resource requirement information, the first network resource template includes indication information or second network resource requirement information, and the indication information is used to obtain the second network resource requirement information.

S514. The NO determines the second network resource requirement information based on the first network resource template or the second network resource template.

Specifically, the NO converts, by parsing the first network resource template or the second network resource template, the first network resource template or the second network resource template into the second network resource requirement information. The second network resource requirement information includes requirement information of one or more network functions and a connection requirement between the network functions. The second network resource requirement information is used to request a second network resource. The second network resource includes at least any one of a network function, a network, a transmission resource, and a network service.

The NO may directly convert a network slice template into requirement information of one or more network functions by using a resource decomposition algorithm, determine a connection relationship between the network functions based on the requirement information of the one or more network functions, and generate a connection requirement between the network functions.

Alternatively, the NO may determine a connection relationship between network functions based on a mapping relationship between a network slice template and a network function, and generate requirement information of the network functions and a connection requirement between the network functions.

S515. The NO sends a second resource request message to an NM/EM or an NFVO/VNFM.

S516. After receiving requirement information of one or more network functions and a connection requirement between the network functions, the NM or the EM selects or deploys, based on requirement information of each network function, a network element that can meet the requirement information of each network function.

Specifically, the NM or the EM queries, based on the received requirement information of one or more network functions and the received connection requirement between the network functions, whether there is one or more available network elements that can meet the requirement information of the network functions. If the NM or the EM determines that there is no available network element, the NM or the EM selects a corresponding network element template (including a VNF information model description template (VNF Descriptor, VNFD)), determines a connection relationship between network elements based on a selected network element instance used to support the network functions or based on information of connection between the network element template and the network functions, and generates a corresponding network service information model description template (NSD) or VNFD.

The NSD is used to describe network information planned by an operator or an integrator. The network information includes a network service (NS) capacity supported by using a VNFD list and includes a list of VNF instances that correspond to different NS capacities.

The VNFD is provided by a virtualized network function provider and includes a VNF function, a VNF-supported capacity list, a virtual machine list required in cases of different capacities, deployment information and ports of various virtual machines, and the like.

S517. The NM/EM sends an NS or VNF instantiation request to the NFVO/VNFM, where the NS instantiation request includes an NSD identifier or an NS instance identifier, and the VNF instantiation request includes a VNFD identifier or a VNF instance identifier.

S517 further includes uploading a corresponding NSD or VNFD template to the NFVO by the NM/EM.

S518. After receiving the NS or VNF instantiation request, the NFVO determines, based on the NSD identifier, the VNFD identifier, the VNF instance identifier, or the NS instance identifier, a resource required for instantiating the target service, and deploys a network slice or a virtualized network function for a target service instance based on the resource required for instantiating the target service.

S519. The NFVO sends, to the NM/EM, a message indicating that an NS or a VNF is instantiated.

S520. After receiving the message indicating that the NS or the VNF is instantiated, the NM/EM configures the instantiated NS or VNF as a second network resource based on the second network resource requirement information and a corresponding service parameter.

S521. The NM/EM sends, to the NO, a message indicating that the second network resource is configured, where the message indicating that the second network resource is configured includes the configured second network resource.

S522. After receiving the message that is sent by the NM/EM and indicates that the second network resource is configured, the NO configures the configured second network resource as the first network resource based on the first network resource requirement information by using the configured second network resource.

S523. The NO sends, to the SO, a message indicating that the first network resource is configured, where the message indicating that the first network resource is configured carries the first network resource.

S524. After receiving the message that is sent by the NO and indicates that the first network resource is configured, the SO instantiates the target service based on the first network resource and the target-service requirement information.

Specifically, when the target service includes a plurality of sub-services, the plurality of sub-services are combined based on the requirement information of each sub-service, to complete configuration of the target service.

After the target service instantiation is fully complete, the SO returns, to the OSS/BSS, information indicating that the target service is instantiated.

It should be noted that if the NO determines that there is an available network slice instance that meets the first network resource requirement information, the NO sends an NS or VNF instantiation request to the NFVO/RO/VNFM. The NS instantiation request includes an NSD identifier or an NS instance identifier, and the VNF instantiation request includes a VNFD identifier or a VNF instance identifier. After receiving the NS or VNF instantiation request sent by the NO, the NFVO/RO/VNFM directly determines, based on the NSD identifier, the VNFD identifier, the VNF instance identifier, or the NS instance identifier, a resource required for instantiating the target service, deploys a network slice or a virtualized network function for a target service instance based on the resource required for instantiating the target service, and sends, to the NO, a message indicating that an NS or a VNF is instantiated.

When a function of the target service does not meet a system requirement, or some functions of the target service need to be updated, the foregoing method provided in this embodiment of the present invention may be further used to scale out or scale in the target service, and the like.

In the solution in this embodiment of the present invention, after receiving the service request message for instantiating the target service, the SO can determine, based on the service request message, the network resource that meets the target-service requirement information; or can determine, based on the service request message, the network resource requirement information corresponding to the target-service requirement information, and then send the first resource request message to the NO to request the network resource. After receiving the first resource request message, the NO can determine, based on the first resource request message, the second network resource that meets the first network resource requirement information, or determine, based on the first resource request message, the second network resource requirement information corresponding to the first network resource requirement information. In this way, according to the solution in this embodiment of the present invention, the corresponding network resource can be obtained based on the target-service requirement information. Therefore, automatic orchestration from the target service to the network resource is implemented, and dynamically adjusting a network resource becomes less complex.

As shown in FIG. 6A to FIG. 6D, scaling out a target service in a network management system is described in this embodiment by using an example in which a target service is scaled out. A first management unit is an SO, and a second management unit is an NO.

Specifically, procedure steps of the service are as follows.

S601. A customer or a BSS sends a service request message to the SO, where the service request message is used to scale out a target service, and the service request message includes a target service instance identifier and scale-out requirement information.

The scale-out requirement information includes at least any one of an SLA request, adding or deleting a sub-service to or from the target service, an identifier of the target service, and an identifier of a first network resource. This embodiment of the present invention is described merely by using an example in which a sub-service is added to the target service.

The service request message carries the scale-out requirement information.

In addition, the service request message carries the target service instance identifier and a target service template identifier. The SO may obtain, based on the target service template identifier, a target service template corresponding to the target service template identifier, and the target service template carries the scale-out requirement information of the target service.

S602. After receiving the service request message, the SO parses the service request message to obtain the scale-out requirement information of the target service.

The SO may parse the service request message to obtain the scale-out requirement information of the target service. When the service request message carries the target service template identifier, the SO may determine, from a template preloaded to the SO and based on the target service template identifier, the target service template corresponding to the target service template identifier, and then obtain the scale-out requirement information of the target service from the determined target service template corresponding to the target service template identifier.

S603. The SO determines, based on the scale-out requirement information of the target service, whether a sub-service needs to be added to the target service, where one sub-service corresponds to one piece of sub-service requirement information.

A manner of determining, by the SO based on the target-service requirement information, whether the target service needs a sub-service in this embodiment of the present invention is not limited in this embodiment of the present invention. For example, if the target-service requirement information is used to instruct to add a new function to the target service, the SO determines that a sub-service is required based on the target-service requirement information.

After step S603 is performed, S604 or S607 is performed selectively. For example, when the target-service requirement information instructs to add a sub-service, the SO performs steps S604 and S605 or steps S604 and S606.

S604. If the SO determines that at least one sub-service needs to be added to the target service, the SO determines whether there is an available sub-service instance that meets requirement information of each sub-service in the at least one sub-service.

S605. If the SO determines that there is an available sub-service instance that meets the sub-service requirement information, the SO determines a first network resource based on the existing sub-service instance that meets the sub-service requirement information.

S606. If the SO determines that there is no available sub-service instance that meets the sub-service requirement information, the SO converts requirement information of a sub-service that needs to be added, into corresponding first network resource requirement information.

S607. If the SO determines that no sub-service needs to be added to the target service, the SO determines whether there is a first network resource that meets the scale-out requirement information of the target service.

S608. The SO determines the first network resource based on the scale-out requirement information of the target service.

S609. The SO determines first network resource requirement information based on the scale-out requirement information of the target service.

For example, the SO may directly convert the scale-out requirement information of the target service into the corresponding first network resource requirement information by using a resource decomposition algorithm, or may determine, based on the scale-out requirement information of the target service, a template corresponding to the scale-out requirement information of the target service, and then obtain the first network resource requirement information from the template corresponding to the scale-out requirement information of the target service.

S610. The SO sends a first resource request message to the NO, where the first resource request message is used to request the first network resource.

The first resource request message carries the first network resource requirement information, or the first resource request message may carry a template identifier of the first network resource.

S611. The NO determines, based on the first resource request message, whether there is a second network resource that meets the first network resource requirement information.

S612. If the NO determines that there is a second network resource that meets the first network resource requirement information, the NO determines the second network resource based on the first network resource requirement information.

S613. If the NO determines that there is no second network resource that meets the first network resource requirement information, the NO determines, based on the first network resource requirement information, second network resource requirement information that meets the first network resource requirement information.

S614. The NO sends a second resource request message to a network manager unit or an element manager unit, where the second resource request message is used to request the second network resource, and the second resource request message carries the second network resource requirement information.

The second network resource requirement information includes a network function scale-out requirement and information about a connection requirement between network functions or a network function addition requirement, and the second resource request message further carries a network function identifier or a network element identifier.

S615. After receiving the second resource request message, an NM or an EM parses the second resource request message, and converts the second network resource requirement information in the second resource request message into a corresponding VNF or NS scale-out request.

S616. The NM/EM sends the VNF or NS scale-out request to an NFVO/VNFM, where the VNF scale-out request includes a VNF instance identifier or an NS instance identifier.

S617. After receiving the VNF or NS scale-out request sent by the NM/EM, the NFVO determines a corresponding VNF or NS instance based on the VNF instance identifier or the NS instance identifier, and scales out the determined VNF or NS instance.

S618. The NFVO sends, to the NM/EM, a message indicating that the NS instance or the VNF instance is scaled out.

Specifically, after receiving the VNF or NS scale-out request sent by the NM/EM, the NFVO obtains, based on the VNF instance identifier or the NS instance identifier that is included in the VNF scale-out request, the VNF instance corresponding to the VNF instance identifier or obtains the NS instance corresponding to the NS instance identifier.

S619. After receiving the message indicating that the NS instance or the VNF instance is scaled out, the NM/EM configures a corresponding service parameter for the second network resource based on the second resource request message by using the NS instance or the VNF instance.

S620. The NM/EM sends, to the NO, a message indicating that the second network resource is configured, where the message indicating that the second network resource is configured carries the second network resource.

S621. After receiving the message that is sent by the NM/EM and indicates that the second network resource is configured, the NO configures the second network resource as the first network resource.

S622. The NO sends the configured first network resource to the SO.

Specifically, after receiving the message that is sent by the NM/EM and indicates that the second network resource is configured, the NO configures the first network resource based on the first network resource requirement information by using the configured second network resource, so that the configured first network resource can meet the first network resource requirement information.

S623. After receiving a message that is sent by the NO and indicates that the first network resource is configured, the SO scales out the target service based on the first network resource.

Specifically, after receiving the message indicating that the first network resource is configured, the SO configures, based on the target-service requirement information carried in the service request message, the first network resource as the target service that meets the target-service requirement information.

It should be noted that in the methods shown in FIG. 3 to FIG. 6D, the steps performed by the first management unit may be referred to as a service orchestration stage, and the steps performed by the second management unit may be referred to as a network resource orchestration stage.

In the solution in this embodiment of the present invention, after receiving the service request message for scaling out the target service, the SO can determine, based on the service request message, the network resource that meets the target-service requirement information, or can determine, based on the service request message, the network resource requirement information corresponding to the target-service requirement information, and then send the first resource request message to the NO to request the network resource. After receiving the first resource request message, the NO can determine, based on the first resource request message, the second network resource that meets the first network resource requirement information, or determine, based on the first resource request message, the second network resource requirement information corresponding to the first network resource requirement information. In this way, according to the solution in this embodiment of the present invention, the corresponding network resource can be obtained based on the target-service requirement information. Therefore, automatic orchestration from the target service to the network resource is implemented, and dynamically adjusting a network resource becomes less complex.

The foregoing mainly describes the solutions in the embodiments of the present invention from the perspective of interaction between network elements. It may be understood that to implement the foregoing functions, each network element, for example, the first management unit or the second management unit, includes a corresponding hardware structure and/or a corresponding software module for performing the functions. A person skilled in the art should easily become aware that the present invention may be implemented by hardware or a combination of hardware and computer software with reference to the units and algorithms steps in the examples described in the embodiments disclosed in this specification. Whether a function is performed by hardware or computer software driven hardware depends on a particular application and a design constraint of the technical solutions. A person skilled in the art may use different methods to implement the described functions for each particular application, but the implementation shall not be considered as going beyond the scope of the present invention.

In the embodiments of the present invention, the first management unit, the second management unit, and the like may be divided into functional modules based on the foregoing method examples. For example, the functional modules may be obtained through division based on the functions, or two or more functions may be integrated into one processing module. The integrated module may be implemented in a form of hardware, or may be implemented in a form of a software function module. It should be noted that the module division in the embodiments of the present invention is an example, and is merely logical function division. There may be other division manners in actual implementation.

Figure 7A:
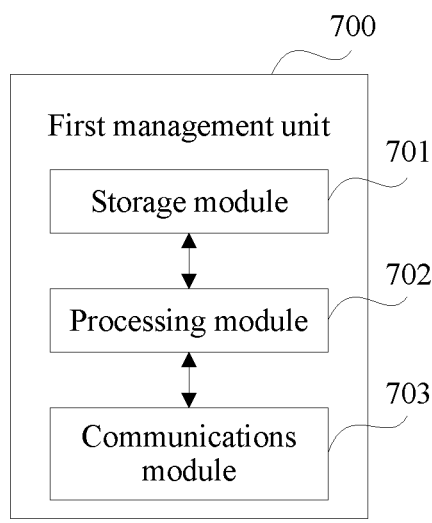
FIG. 7A is a schematic structural diagram of a first management unit according to an embodiment of the present invention.

When an integrated unit is used, FIG. 7A is a possible schematic structural diagram of the first management unit in the foregoing embodiments. A first management unit 700 includes a processing module 702 and a communications module 703. The processing module 702 is configured to control and manage actions of the first management unit. For example, a processing module 702 is configured to support the first management unit in performing processes S301, S302, and S303 in FIG. 3, processes S402, S403, and S404 in FIG. 4, processes S502, S503, S504, S505, S506, S507, S508, S509, and S510 in FIG. 5A to FIG. 5E, processes S602, S603, S604, S605, S606, S607, S608, S609, and S610 in FIG. 6A to FIG. 6D, and/or other processes used in the technology described in this specification. The communications module 703 is configured to support communication between the first management unit and other network entities, for example, communication between functional modules or network entities shown in FIG. 2a to FIG. 2e. The first management unit may further include a storage module 701 configured to store program code and data of the first management unit.

The processing module 702 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 703 may be a transceiver, a transceiver circuit, a communications interface, or the like. The storage module 701 may be a memory.

Figure 7B:
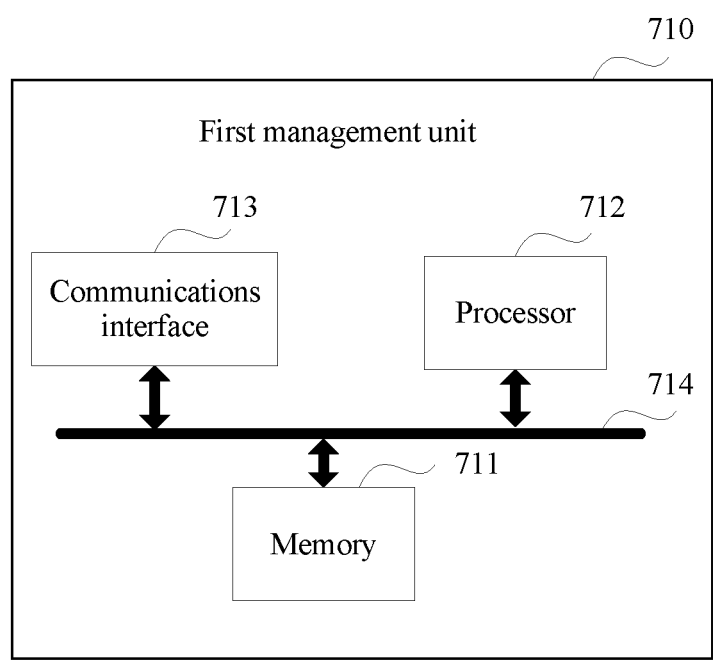
FIG. 7B is a schematic structural diagram of another first management unit according to an embodiment of the present invention.

When the processing module 702 is a processor, the communications module 703 is a communications interface, and the storage module 701 is a memory, the first management unit in this embodiment of the present invention may be a first management unit shown in FIG. 7B.

As shown in FIG. 7B, a first management unit 710 includes a processor 712, a communications interface 713, a memory 711, and a bus 714. The communications interface 713, the processor 712, and the memory 711 are mutually connected by using the bus 714. The bus 714 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 7B, but this does not mean that there is only one bus or only one type of bus.

Figure 8A:
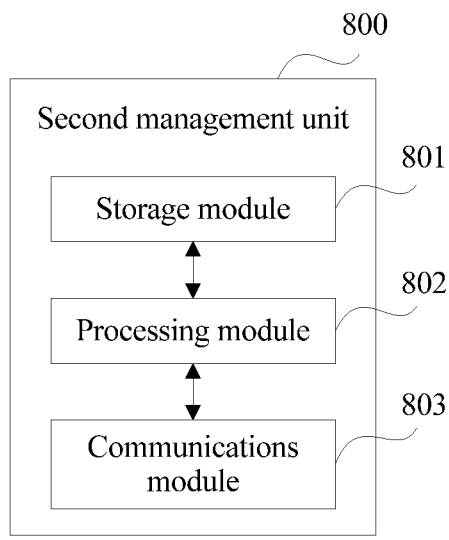
FIG. 8A is a schematic structural diagram of a second management unit according to an embodiment of the present invention.

When an integrated unit is used, FIG. 8A is a possible schematic structural diagram of the second management unit in the foregoing embodiments. A second management unit 800 includes a processing module 802 and a communications module 803. The processing module 802 is configured to control and manage actions of the second management unit. For example, the processing module 802 is configured to support the second management unit in performing processes S405, S406, and S407 in FIG. 4, processes S511, S512, S512A, S513, S514, S515, S522, and S523 in FIG. 5A to FIG. 5E, processes S611, S612, S613, S614, S621, and S622 in FIG. 6A to FIG. 6D, and/or other processes used in the technology described in this specification. The communications module 803 is configured to support communication between the second management unit and other network entities, for example, communication between functional modules or network entities shown in FIG. 2a to FIG. 2e. The second management unit may further include a storage module 801 configured to store program code and data of the second management unit.

The processing module 802 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 803 may be a transceiver, a transceiver circuit, a communications interface, or the like. The storage module 801 may be a memory.

Figure 8B:
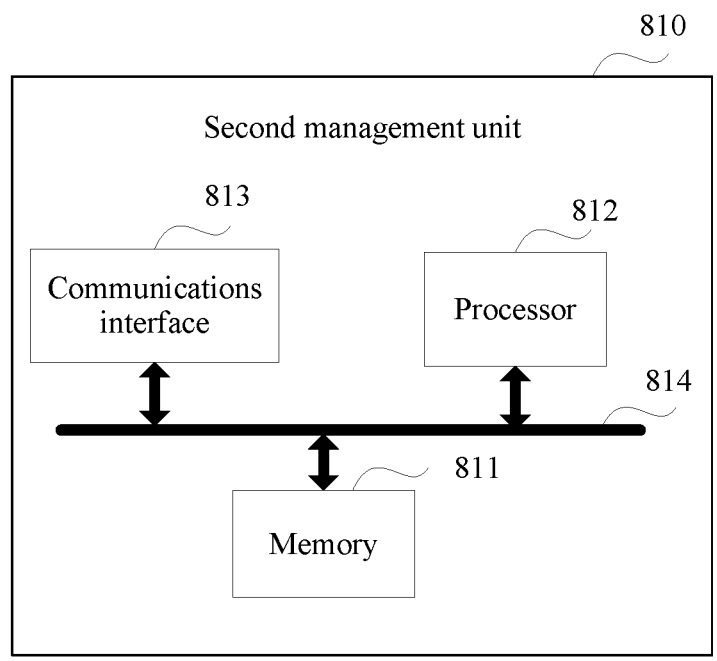
FIG. 8B is a schematic structural diagram of another second management unit according to an embodiment of the present invention.

When the processing module 802 is a processor, the communications module 803 is a communications interface, and the storage module 801 is a memory, the second management unit in this embodiment of the present invention may be a second management unit shown in FIG. 8B.

As shown in FIG. 8B, a second management unit 810 includes a processor 812, a communications interface 813, a memory 811, and a bus 814. The communications interface 813, the processor 812, and the memory 811 are mutually connected by using the bus 814. The bus 814 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 8B, but this does not mean that there is only one bus or only one type of bus.

Method or algorithm steps described with reference to the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method of network resource management, comprising:
   receiving, by a first management network element, a service request message used to manage a target service and to carry target-service requirement information;
   determining, by the first management network element based on the service request message:
   first network resource requirement information for a first network resource corresponding to the target-service requirement information; and
   sending, by the first management network element, a first resource request message to a second management network element, wherein the first resource request message is used to request the first network resource, and the first resource request message carries the first network resource requirement information;
   receiving, by the second management network element from the first management network element, the first resource request message; and
   determining, by the second management network element based on the first resource request message: second network resource requirement information for a second network resource corresponding to the first network resource requirement information, wherein the first network resource comprises a network slice, and the second network resource comprises a network element; and
   sending, by the second management network element, a second resource request message to a third management network element, wherein the second resource request message is used to request the second network resource, and the second resource request message carries the second network resource requirement information.

2. The method according to claim 1, further comprising determining, by the first management network element based on the service request message, whether there is a network resource that meets the target-service requirement information, comprising:
   determining, by the first management network element, sub-service requirement information of the target service based on the service request message; and
   determining, by the first management network element, a network resource that meets the sub-service requirement information.

3. The method according to claim 1, wherein the determining, by the first management network element based on the service request message, first network resource requirement information corresponding to the target-service requirement information comprises:
   determining, by the first management network element, sub-service requirement information of the target service based on the service request message; and
   determining, by the first management network element, the first network resource requirement information based on the sub-service requirement information.

4. The method according to claim 1, wherein the target-service requirement information comprises at least one of a service descriptor identifier, a network resource descriptor identifier, service type information, access control information, Service Level Agreement (SLA) information, or a terminal usage type.

5. A method of network resource management, comprising:
   receiving, by a second management network element from a first management network element, a first resource request message used to request a first network resource and to carry first network resource requirement information; and
   determining, by the second management network element based on the first resource request message:
   second network resource requirement information for a second network resource corresponding to the first network resource requirement information, wherein the first network resource comprises a network slice, and the second network resource comprises a network element; and
   sending, by the second management network element, a second resource request message to a third management network element, wherein the second resource request message is used to request the second network resource, and the second resource request message carries the second network resource requirement information.

6. The method according to claim 5, further comprising:
   determining, by the second management network element, whether there is a second network resource that meets the first network resource requirement information.

7. The method according to claim 5, further comprising:
   when there exists a second network resource that meets the first network resource requirement information, configuring, by the second management network element, the second network resource based on the first network resource requirement information, to obtain the first network resource.

8. The method according to claim 5, wherein determining, by the second management network element based on the first resource request message, second network resource requirement information comprises:
   obtaining, by the second management network element, a first network resource template or a second network resource template based on the first resource request message, wherein the first network resource template or the second network resource template corresponds to the first network resource requirement information, the first network resource template includes indication information or the second network resource requirement information, and the indication information is used to obtain the second network resource requirement information; and determining, by the second management network element, the second network resource requirement information based on the first network resource template or the second network resource template.

9. A communications system, wherein the system comprises a first management network element and a second management network element,
wherein the first management network element comprises:
a processor; and
a memory, coupled to the processor and configured to store computer executable program code comprising an instruction, and when the processor executes the instruction, the instruction enables the first management network element to perform the following operations:
receiving a service request message used to manage a target service and to carry target-service requirement information;
determining, based on the service request message:
first network resource requirement information for a first network resource corresponding to the target-service requirement information; and
sending a first resource request message to the second management network element, wherein the first resource request message is used to request the first network resource, and the first resource request message carries the first network resource requirement information; and
wherein the second management network element comprises:
a processor; and
a memory, coupled to the processor and configured to store computer executable program code comprising an instruction, and when the processor executes the instruction, the instruction enables the second management network element to perform the following operations:
receiving from the first management network element, the first resource request message; and
determining based on the first resource request message:
second network resource requirement information for a second network resource corresponding to the first network resource requirement information, wherein the first network resource comprises a network slice, and the second network resource comprises a network element; and
sending a second resource request message to a third management network element, wherein the second resource request message is used to request the second network resource, and the second resource request message carries the second network resource requirement information.

10. The system according to claim 9, wherein the operations performed by the first management network element further comprise determining whether there is a network resource, wherein the determining whether there is a network resource comprises:
determining sub-service requirement information of the target service based on the service request message; and determining a network resource that meets the sub-service requirement information.

11. The system according to claim 9, wherein the operations performed by the first management network element further comprise determining whether there is a network resource, wherein the determining whether there is a network resource comprises:
determining sub-service requirement information of the target service based on the service request message; and determining the first network resource requirement information based on the sub-service requirement information.

12. The system according to claim 9, wherein the target-service requirement information comprises at least any one of a service descriptor identifier, a network resource descriptor identifier, service type information, access control information, Service Level Agreement (SLA) information, or a terminal usage type.

13. A communications apparatus, comprising:
a processor; and
a memory, coupled to the processor and configured to store computer executable program code comprising an instruction, and when the processor executes the instruction, the instruction enables the communications apparatus to perform the following operations:
receiving from a first management network element, a first resource request message used to request a first network resource and to carry first network resource requirement information; and
determining based on the first resource request message:
second network resource requirement information for a second network resource corresponding to the first network resource requirement information, wherein the first network resource comprises a network slice, and the second network resource comprises a network element; and
sending a second resource request message to a third management network element, wherein the second resource request message is used to request the second network resource, and the second resource request message carries the second network resource requirement information.

14. The communications apparatus according to claim 13, wherein when the processor executes the instruction, the instruction enables the communications apparatus to further perform the following operations:
determining whether there is a second network resource that meets the first network resource requirement information.

15. The communications apparatus according to claim 13, wherein when the processor executes the instruction, the instruction enables the communications apparatus to further perform the following operations:
when there exists a second network resource that meets the first network resource requirement information, configuring the second network resource based on the first network resource requirement information, to obtain the first network resource.

16. The communications apparatus according to claim 13, wherein when the processor executes the instruction, the instruction enables the communications apparatus to further perform the following operations:
obtaining a first network resource template or a second network resource template based on the first resource request message, wherein the first network resource template or the second network resource template corresponds to the first network resource requirement information, the first network resource template includes indication information or the second network resource requirement information, and the indication information is used to obtain the second network resource requirement information; and determining the second network resource requirement information based on the first network resource template or the second network resource template.

\* \* \* \* \*